United States Patent
Matsui et al.

(10) Patent No.: US 12,061,329 B2
(45) Date of Patent: Aug. 13, 2024

(54) MICROSCOPE SYSTEM, IMAGING METHOD, AND IMAGING DEVICE

(71) Applicant: SONY GROUP CORPORATION, Tokyo (JP)

(72) Inventors: Takeshi Matsui, Tokyo (JP); Hirokazu Tatsuta, Tokyo (JP); Mitsunori Ueda, Tokyo (JP); Seiji Wada, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 38 days.

(21) Appl. No.: 17/906,363

(22) PCT Filed: Mar. 15, 2021

(86) PCT No.: PCT/JP2021/010267
§ 371 (c)(1),
(2) Date: Sep. 15, 2022

(87) PCT Pub. No.: WO2021/193177
PCT Pub. Date: Sep. 30, 2021

(65) Prior Publication Data
US 2023/0111094 A1    Apr. 13, 2023

(30) Foreign Application Priority Data
Mar. 27, 2020   (JP) .................. 2020-057779

(51) Int. Cl.
*H04N 23/74* (2023.01)
*G02B 21/00* (2006.01)
(Continued)

(52) U.S. Cl.
CPC ....... *G02B 21/241* (2013.01); *G02B 21/0032* (2013.01); *G02B 21/008* (2013.01);
(Continued)

(58) Field of Classification Search
CPC ............... H04N 23/673; G02B 21/241; G02B 21/0032; G02B 21/008; G02B 21/08
See application file for complete search history.

(56) References Cited

U.S. PATENT DOCUMENTS 9,772,465 B2 *  9/2017  Osborne .............. H04N 17/002
10,458,781 B2 * 10/2019  Odaira ................ G02B 21/086
(Continued)

FOREIGN PATENT DOCUMENTS

JP    2005-292839 A    10/2005
JP    2015-522850 A     8/2015
(Continued)

OTHER PUBLICATIONS

International Search Report and Written Opinion of PCT Application No. PCT/JP2021/010267, issued on May 18, 2021, 09 pages of ISRWO.

Primary Examiner — Brian P Yenke
(74) Attorney, Agent, or Firm — CHIP LAW GROUP

(57) ABSTRACT

A microscope system includes: a light source unit that emits linear illumination parallel to a first direction; an objective lens that condenses the linear illumination onto a measurement target region; an acquisition unit that acquires a first optical signal indicating a light intensity value of light emitted from the measurement target region by the linear illumination; and a focus control unit that controls at least one of a relative position or a relative posture of the light source unit and an imaging unit that generates the first optical signal on a basis of a light intensity distribution of the first optical signal.

9 Claims, 24 Drawing Sheets

(51) Int. Cl.
  *G02B 21/08* (2006.01)
  *G02B 21/24* (2006.01)
  *H04N 23/67* (2023.01)
  *H04N 23/71* (2023.01)

(52) U.S. Cl.
  CPC ........... *G02B 21/08* (2013.01); *H04N 23/673* (2023.01); *H04N 23/71* (2023.01); *H04N 23/74* (2023.01)

(56) References Cited

U.S. PATENT DOCUMENTS

| | | | | |
|---|---|---|---|---|
| 10,473,906 | B2* | 11/2019 | Nakano | G02B 21/006 |
| 10,823,675 | B2* | 11/2020 | Nakada | G01N 21/6458 |
| 10,877,257 | B2* | 12/2020 | Matsubara | G02B 21/025 |
| 2003/0043458 | A1* | 3/2003 | Minobe | G02B 21/14 |
| | | | | 359/368 |
| 2006/0028716 | A1* | 2/2006 | Gilbert | G02B 21/26 |
| | | | | 359/368 |
| 2015/0226949 | A1* | 8/2015 | Fukumoto | G02B 21/002 |
| | | | | 359/199.3 |
| 2016/0246043 | A1* | 8/2016 | Morita | G02B 27/56 |
| 2016/0356978 | A1* | 12/2016 | Osborne | G02B 7/025 |
| 2017/0059842 | A1* | 3/2017 | Kaneki | G02B 21/245 |
| 2017/0276608 | A1* | 9/2017 | Kanarowski | G02B 21/0032 |
| 2019/0121111 | A1* | 4/2019 | Hayashi | G02B 21/06 |
| 2019/0339485 | A1* | 11/2019 | Nakamura | G02B 5/1814 |
| 2020/0088979 | A1* | 3/2020 | Ota | G02B 27/0977 |
| 2023/0152563 | A1* | 5/2023 | Ueda | G03B 15/05 |
| | | | | 359/391 |
| 2023/0418038 | A1* | 12/2023 | Suzuki | G02B 21/06 |
| 2024/0053267 | A1* | 2/2024 | Ikeda | G01N 21/6456 |

FOREIGN PATENT DOCUMENTS

| | | |
|---|---|---|
| JP | 2015-187748 A | 10/2015 |
| JP | 2019-079049 A | 5/2019 |
| JP | 2019-207444 A | 12/2019 |

* cited by examiner

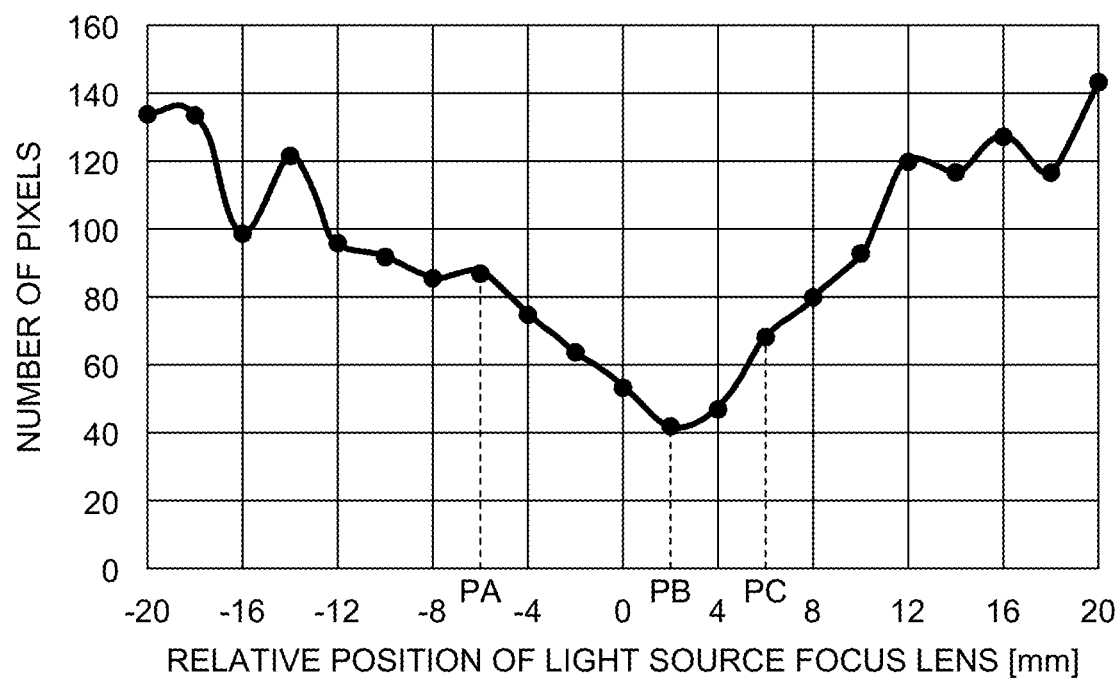

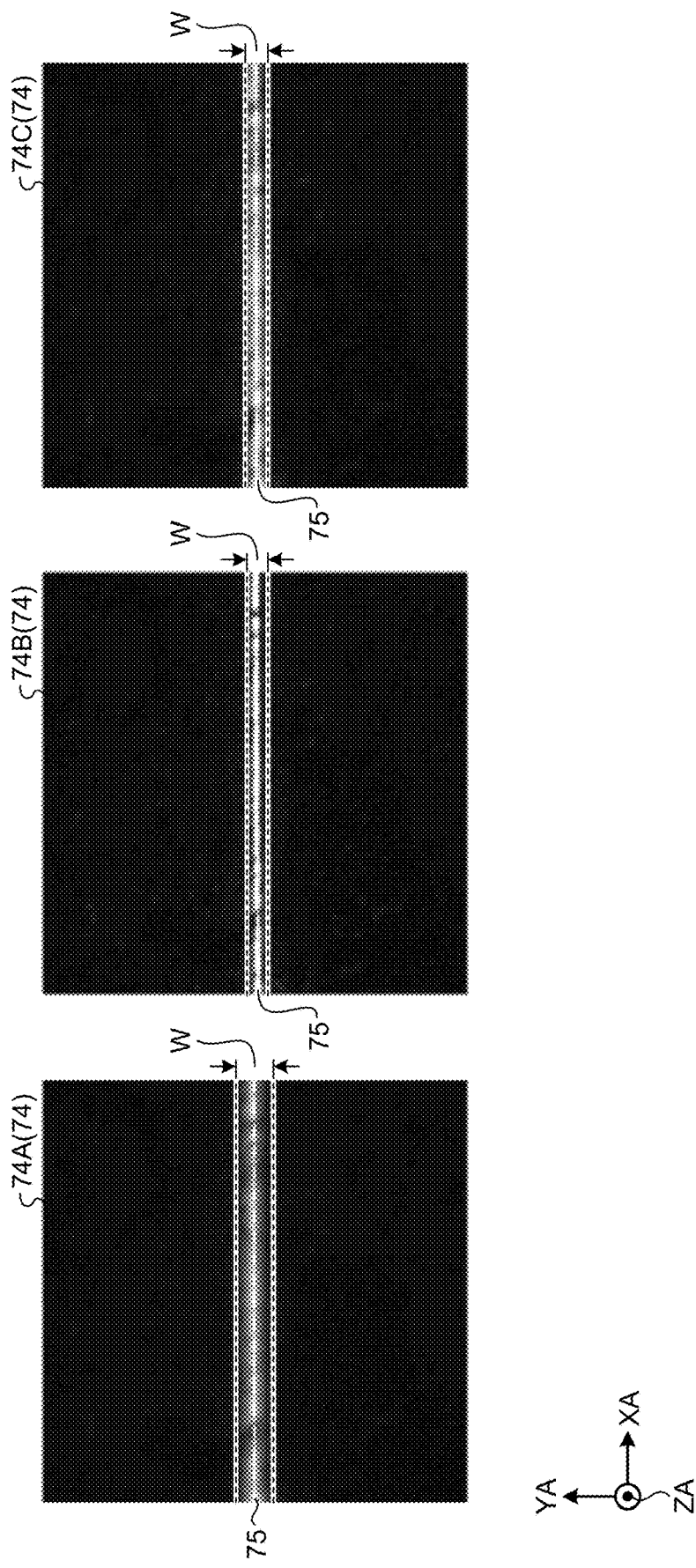

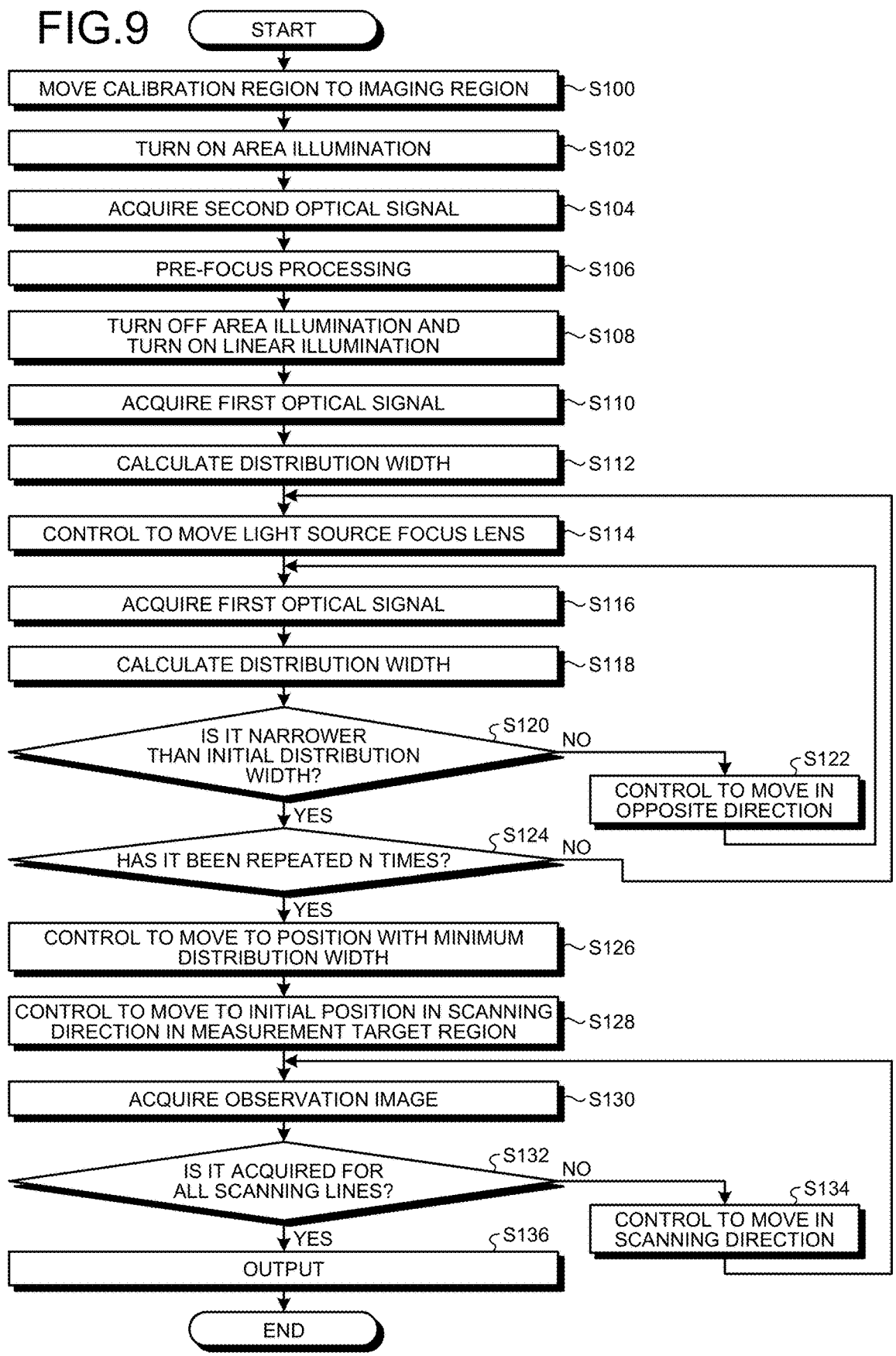

FIG.15
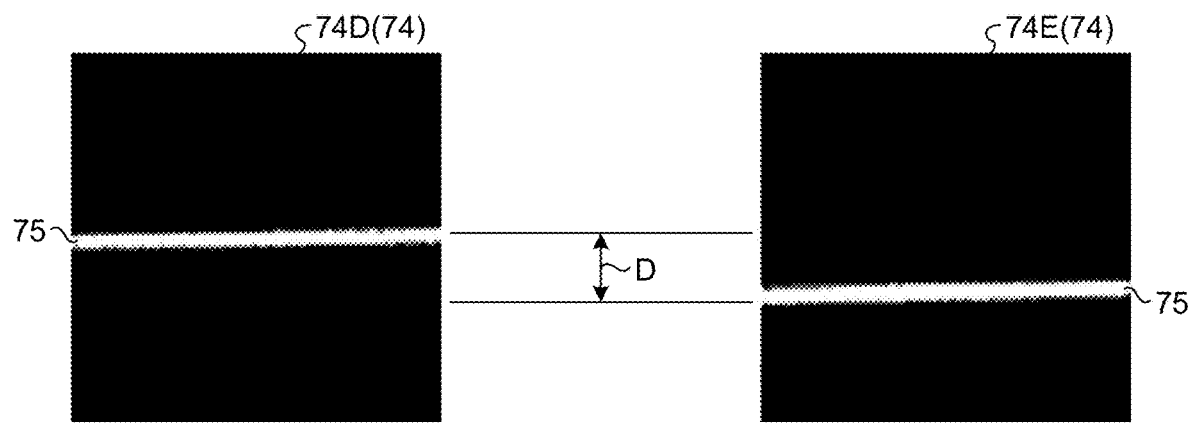
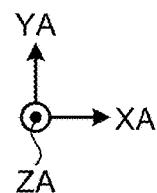
FIG.16
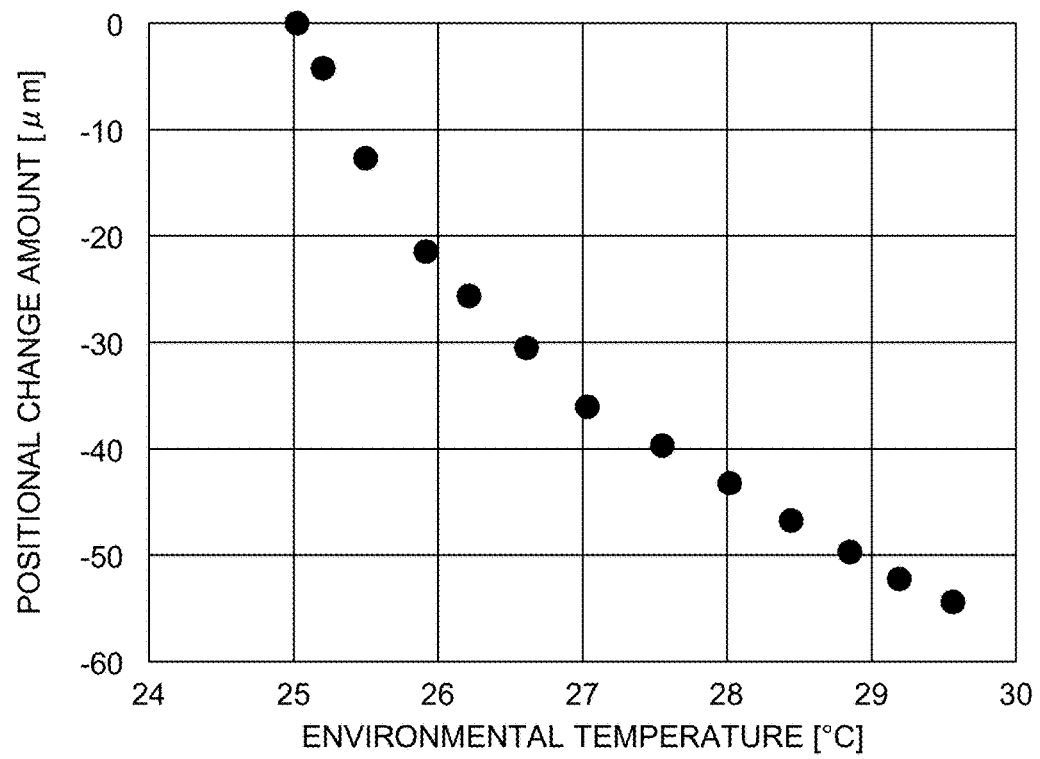

MICROSCOPE SYSTEM, IMAGING METHOD, AND IMAGING DEVICE

CROSS REFERENCE TO RELATED APPLICATIONS

This application is a U.S. National Phase of International Patent Application No. PCT/JP2021/010267 filed on Mar. 15, 2021, which claims priority benefit of Japanese Patent Application No. JP 2020-057779 filed in the Japan Patent Office on Mar. 27, 2020. Each of the above-referenced applications is hereby incorporated herein by reference in its entirety.

FIELD

The present disclosure relates to a microscope system, an imaging method, and an imaging device.

BACKGROUND

Technology of obtaining a captured image by irradiating a measurement target region with light and receiving light emitted from the measurement target region is disclosed. For example, a linear sensor receives light emitted from the measurement target region by irradiation with linear illumination. Technology of adjusting a focus by, then, adjusting the position of an objective lens that condenses light to a measurement target region using a contrast ratio of received light intensity is disclosed.

CITATION LIST

Patent Literature

Patent Literature 1: JP 2005-292839 A

SUMMARY

Technical Problem

However, in a case where the characteristics of a specimen included in a measurement target region are examined by optical wavelength characteristics that have been measured, there is a possibility that the intensity fluctuation may lead to a detection error.

Therefore, the present disclosure proposes a microscope system, an imaging method, and an imaging device capable of suppressing detection errors.

Solution to Problem

To solve the problems described above, a microscope system according to an embodiment of the present disclosure includes: a light source unit that emits linear illumination parallel to a first direction; an objective lens that condenses the linear illumination onto a measurement target region; an acquisition unit that acquires a first optical signal indicating a light intensity value of light emitted from the measurement target region by the linear illumination; and a focus control unit that controls at least one of a relative position or a relative posture of the light source unit and an imaging unit that generates the first optical signal on a basis of a light intensity distribution of the first optical signal.

BRIEF DESCRIPTION OF DRAWINGS

FIG. 7 is a line chart illustrating an example of a relationship between the relative position of the light source focus lens and the distribution width according to the first embodiment of the present disclosure.

FIG. 8 is a schematic diagram illustrating an example of the first optical signal according to the first embodiment of the present disclosure.

FIG. 9 is a flowchart illustrating an example of a flow of information processing according to the first embodiment of the present disclosure.

FIG. 15 is an explanatory diagram of a shift of a light receiving region according to the second embodiment of the present disclosure.

FIG. 16 is a graph illustrating an example of the relationship between the environmental temperature and the position change amount according to the second embodiment of the present disclosure.

DESCRIPTION OF EMBODIMENTS

Hereinafter, embodiments of the present disclosure will be described in detail on the basis of the drawings. Note that in each of the following embodiments, the same parts are denoted by the same symbols, and redundant description will be omitted.

First Embodiment

Figure 1:
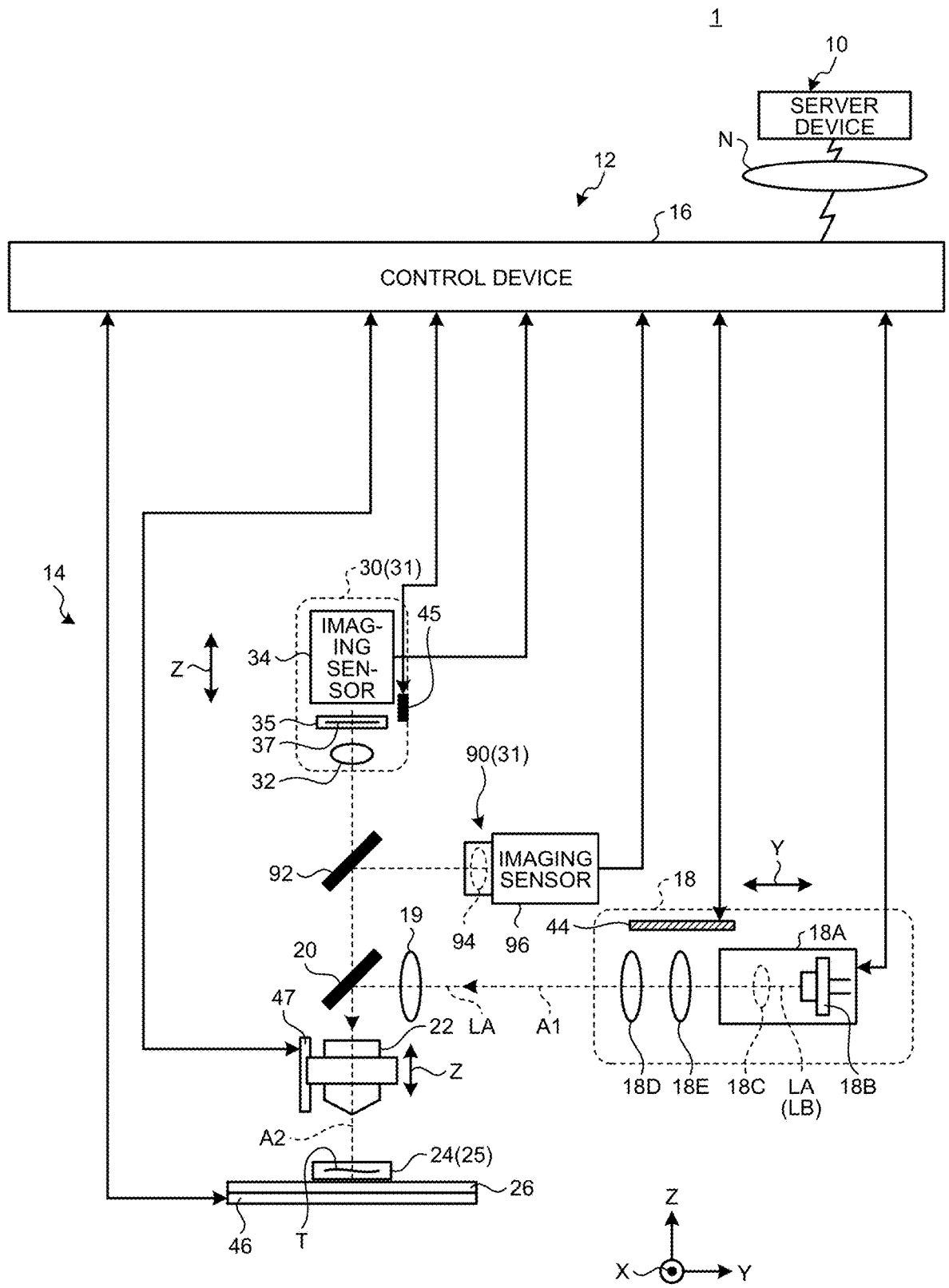
FIG. 1 is a schematic diagram illustrating an example of a microscope system according to a first embodiment of the present disclosure.

FIG. 1 is a schematic diagram illustrating an example of a microscope system 1 of the present embodiment.

The microscope system 1 is a system that irradiates a measurement target region 25 with linear illumination LA and receives the light emitted from the measurement target region 25. Details of the linear illumination LA and the measurement target region 25 will be described later.

The microscope system 1 includes an imaging device 12. The imaging device 12 is communicably connected to a server device 10 via, for example, a wireless communication network such as a network N or a wired communication network. The server device 10 may be a computer.

In the present embodiment, a direction along a direction in which an objective lens 22 and a specimen T, which will be described later, approach each other and separate from each other will be referred to as a Z-axis direction in the description. In addition, the description will be given on the premise that the Z-axis direction coincides with the thickness direction of the specimen T. In addition, the present embodiment will be described on the premise that the Z-axis direction and an optical axis A2 of the objective lens 22 are parallel. It is further based on the premise that a stage 26 to be described later is a two-dimensional plane expressed by two axes (an X-axis direction and a Y-axis direction) orthogonal to the Z-axis direction. A plane parallel to the two-dimensional plane of the stage 26 may be referred to as an XY plane in the description. Details of these units will be described later.

The imaging device 12 includes a measurement unit 14 and a control device 16. The measurement unit 14 and the control device 16 are connected so as to be able to exchange data or signals.

The measurement unit 14 has an optical mechanism that measures light emitted from the measurement target region 25. The measurement unit 14 is applied to, for example, an optical microscope.

The measurement unit 14 includes a light source unit 18, a split mirror 20, the objective lens 22, the stage 26, a semi-transparent mirror 28, an imaging unit 31, a third drive unit 46, and a fourth drive unit 47. The imaging unit 31 includes an imaging optical unit 30 and an imaging optical unit. For the split mirror 20, a semi-transparent mirror or a dichroic mirror is selected depending on a measurement target.

The light source unit 18 emits the linear illumination LA and area illumination LB. The light source unit 18 selectively emits light by switching between the linear illumination LA and the area illumination LB. Note that the light source unit 18 may substitute the area illumination LB with the linear illumination LA.

The light source unit 18 includes a light source unit 18A, a light source focus lens 18D, and a first drive unit 44. A light source unit 18A includes a light source 18B and a collimator lens 18C.

The light source 18B selectively switches between the linear illumination LA and the area illumination LB to emit light. Switching to the linear illumination LA or the area illumination LB is performed by control by the control device 16.

The linear illumination LA is light having a linear shape parallel to a first direction. The linear shape indicates a shape of a cross section orthogonal to an optical axis A1 of the linear illumination LA emitted from the light source 18B. In other words, the linear shape indicates the shape of the illumination light with which the linear illumination LA emitted from the light source 18B irradiates the specimen T. The optical axis A1 indicates an optical axis from the light source 18B to the split mirror 20. In other words, the optical axis A1 corresponds to the optical axes of the collimator lens 18C and the light source focus lens 18D.

Specifically, the linear illumination LA is light in which the length of the light flux in a first direction on a two-dimensional plane orthogonal to the optical axis is several times or more (for example, greater than or equal to 100 times) the length in a direction orthogonal to the first direction. In the present embodiment, a case where the first direction that is the longitudinal direction of the linear illumination LA is substantially parallel to the X-axis direction in FIG. 1 will be described as an example. Details of the X-axis direction will be described later. Note that the term "substantially parallel" is not limited to a mode in which directions completely coincide with each other and also includes a state in which the direction is inclined at an angle within a predetermined range.

The area illumination LB is light emitted at the time of imaging the specimen T to be described later. Specifically, the area illumination LB is light emitted to a region wider than that of the linear illumination LA in the Y-axis direction.

For example, the light source 18B emits the linear illumination LA by condensing light in only one direction using a cylindrical lens 18E arranged in the optical path. The light source 18B may emit the linear illumination LA by emitting light through a slit parallel to the X-axis direction.

Note that the light source 18B is not limited to a configuration in which a plurality of laser diodes is arranged. For example, as the light source 18B, a mercury lamp or a halogen lamp having a broad spectral band may be used, or a laser light source having a narrow band may be used.

The light source 18B may selectively emit light having a wavelength range in which the specimen T included in the measurement target region 25 emits fluorescence. In addition, the light source unit 18 may include a filter that selectively transmits light of the wavelength range. In the present embodiment, a mode in which the light source 18B emits the linear illumination LA and the area illumination LB in the wavelength range in which the specimen T emits fluorescence will be described as an example. In the present embodiment, the linear illumination LA and the area illumination LB may be light of different wavelength ranges in a wavelength range where the specimen T emits fluorescence or may be light of the same wavelength range.

A case where the linear illumination LA is emitted from the light source 18B will be described as an example. Note that, also in a case where the area illumination LB is emitted from the light source 18B, the optical path of the light is similar to that of the linear illumination LA.

The light source unit 18 includes the first drive unit 44. The first drive unit 44 modifies the relative position along the optical axis A1 of at least one of a plurality of optical components included in the light source unit 18. The first drive unit 44 is, for example, a known actuator. The actuator may be, for example, any one of a motor, an ultrasonic wave, and a linear motor. It suffices to use, for example, SIGMA KOKI; SGMV 20-35 (X) or the like for the first drive unit 44.

In the present embodiment, the first drive unit 44 moves the light source focus lens 18D in a direction approaching or separating from the split mirror 20 along the optical axis A1. The distance between the light source focus lens 18D and the split mirror 20 is adjusted by the drive of the first drive unit 44, thereby adjusting the distance to the light source 18B. By adjusting these distances, the focus of the light source focus lens 18D is adjusted.

Note that the first drive unit 44 may be a drive unit that moves at least one of the light source unit 18A or the light source focus lens 18D along the optical axis A1 in a direction approaching each other or a direction separating from each other. Furthermore, the first drive unit 44 may be a drive unit that moves the entire light source unit 18 along the optical axis A1 in a direction approaching or separating from the split mirror 20. In the present embodiment, a mode in which the first drive unit 44 moves the light source focus lens 18D along the optical axis A1 will be described as an example.

The linear illumination LA emitted from the light source 18B is converted into substantially parallel light by the collimator lens 18C, then temporarily condensed in a linear shape by the light source focus lens 18D, converted into substantially parallel light again by an image forming lens 19, and then reaches the split mirror 20. Note that it is based on the premise that the cylindrical lens 18E has no curvature in the illustrated direction at the time of irradiation with the linear illumination LA. On the other hand, at the time of irradiation with the area illumination LB, the cylindrical lens 18E has a curvature in the illustrated direction.

The split mirror 20 reflects the linear illumination LA and the area illumination LB and transmits light in wavelength ranges other than that of the linear illumination LA or the area illumination LB. In the present embodiment, the split mirror 20 transmits light emitted from the measurement target region 25. The linear illumination LA is reflected by the split mirror 20 and reaches the objective lens 22.

The objective lens 22 is a focus lens that condenses the linear illumination LA or the area illumination LB on the measurement target region 25. Specifically, the objective lens 22 irradiates the measurement target region 25 with the linear illumination LA or the area illumination LB by condensing the linear illumination LA or the area illumination LB on the measurement target region 25. Note that the area illumination LB may be replaced with the linear illumination LA.

The objective lens 22 includes the fourth drive unit 47. The fourth drive unit 47 moves the objective lens 22 in the Z-axis direction in a direction approaching or separating from the measurement target region 25. By adjusting the distance between the objective lens 22 and the measurement target region 25, the focus of the objective lens 22 is adjusted.

Meanwhile, the third drive unit 46 moves the stage 26 in a direction (X-axis direction, Y-axis direction) orthogonal to the Z-axis direction. As the stage 26 moves, the specimen T placed on the stage 26 moves relative to the objective lens 22 in the X-axis direction or the Y-axis direction.

Note that the measurement unit 14 only needs to include at least one of the third drive unit 46 or the fourth drive unit 47 and is not limited to a configuration including the both.

Note that, in the above description, it has been described that the longitudinal direction of the linear illumination LA when emitted from the light source 18B is substantially parallel to the X-axis direction. However, the longitudinal direction of the linear illumination LA is not limited to the mode of being substantially parallel to the X-axis direction. For example, the longitudinal direction of the linear illumination LA when emitted from the light source 18B may be substantially parallel to the Z-axis direction.

The measurement target region 25 includes the specimen T. In the present embodiment, the measurement target region 25 includes a measurement target member 24.

The measurement target member 24 includes the specimen T. The measurement target member 24 includes, for example, a pair of glass members and the specimen T placed between the pair of glass members. A glass member is, for example, a glass slide. A glass member may be referred to as a coverslip. The glass members are only required to allow the specimen T to be placed thereon and are not limited to those made of glass. The glass members are only required to transmit the light emitted from the linear illumination LA, the area illumination LB, and the specimen T. Transmitting means that transmittance of light to be transmitted is higher than or equal to 80%.

Note that the measurement target member 24 may have a configuration in which the specimen T is placed on a glass member and is not limited to a configuration in which the specimen T is placed between the pair of glass members. Alternatively, the specimen T may be placed in the measurement target member 24 in a state of being sealed by an encapsulant.

The specimen T is a measurement target in the microscope system 1. That is, the specimen T is an object from which a captured image is obtained by the microscope system 1. In the present embodiment, a mode in which the specimen T emits fluorescence by irradiation of each of the linear illumination LA and the area illumination LB will be described as an example. Examples of the specimen T include microorganisms, cells, liposomes, red blood cells, white blood cells, and platelets in blood, vascular endothelial cells, minute cell pieces of epithelial tissue, and pathological tissue slices of various organs. Note that the specimen T may be an object such as a cell labeled with a fluorescent pigment that emits fluorescence by irradiation with each of the linear illumination LA and the area illumination LB. In addition, the specimen T is not limited to an object that emits fluorescence by irradiation with each of the linear illumination LA and the area illumination LB. For example, the specimen T may reflect or scatter light when irradiated with each of the linear illumination LA and the area illumination LB.

Note that, in the following description, the fluorescence emitted from the specimen T by the irradiation of each of the linear illumination LA and the area illumination LB may be simply referred to as light.

The specimen T in a state of being sealed by the encapsulant may be placed in the measurement target region 25. As the encapsulant, a known material that transmits each of the linear illumination LA, the area illumination LB, and light emitted from the specimen T that are incident on the measurement target region 25 may be used. The encapsulant may be either liquid or solid.

In the present embodiment, the measurement target region 25 includes the measurement target member 24 and a calibration region 27.

Figure 2A:
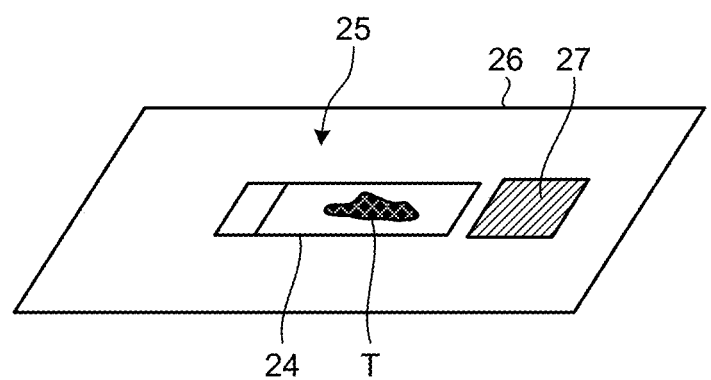
FIG. 2A is a schematic diagram illustrating an example of a measurement target region according to a second embodiment of the present disclosure.

FIG. 2A is a schematic diagram illustrating an example of the measurement target region 25 of the present embodiment. The measurement target region 25 is placed on the stage 26. The measurement target member 24 has, for example, a configuration in which the specimen T is placed between a pair of glass slides.

The calibration region 27 is a region that emits light of a second specific wavelength range by irradiation of light of a first specific wavelength range. The first specific wavelength range is preferably a wavelength range that does not overlap the wavelength range in which the specimen T emits fluorescence. The first specific wavelength range and the second specific wavelength range may not overlap with each other at least partially or may entirely overlap with each other.

That is, the calibration region 27 is a region in which it is specified in advance light of which wavelength range is emitted when a wavelength of which wavelength range is emitted.

For the calibration region 27, for example, fluorescent glass or the like that is excited by irradiation with light in the first specific wavelength range and emits light in the second specific wavelength range is used. The fluorescent glass is, for example, a product by Sumita Optical Glass, Inc., Trade name: Luminass.

As illustrated in FIG. 2A, for example, the measurement target region 25 is only required to have a configuration in which the measurement target region 25 and the calibration region 27 are arranged side by side along the XY plane on the stage 26. For example, it is based on the premise that a fluorescently stained cell is used as the specimen T. In this case, the calibration region 27 can be disposed on the stage 26 without affecting the specimen T arranged between the glass slides.

Figure 2B:
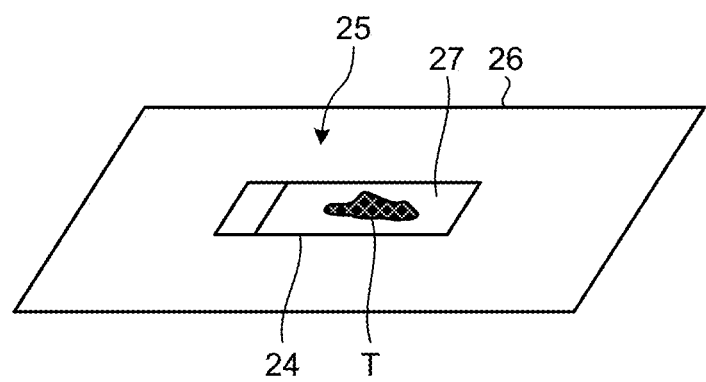
FIG. 2B is a schematic diagram illustrating an example of a measurement target region according to the second embodiment of the present disclosure.

Alternatively, the calibration region 27 may be included in the measurement target region 25. FIG. 2B is a schematic diagram illustrating an example of the measurement target region 25. As illustrated in FIG. 2B, a sealing region of an encapsulant sealed between the pair of glass slides included in the measurement target region 25 may be used as the calibration region 27. In this case, a region where the specimen T is not included in the thickness direction of the measurement target region 25 functions as the calibration region 27. Moreover, in this case, a material that emits light in the second specific wavelength range by irradiation with light in the first specific wavelength range may be used as the encapsulant.

Referring back to FIG. 1, the description will be continued. The light emitted from the measurement target region 25 by the irradiation with the linear illumination LA passes through the objective lens 22 and the split mirror 20 and reaches a dichroic mirror 92. The light emitted from the measurement target region 25 includes at least one of reflected light reflected by the measurement target region 25 by irradiation with the linear illumination LA or the area illumination LB or light emitted by the measurement target region 25. The reflected light includes scattered light. The light emitted from the measurement target region 25 includes fluorescence emitted from the specimen T.

The dichroic mirror 92 distributes a part of the light emitted from the measurement target region 25 to the imaging optical unit 30 and distributes the rest to the imaging optical unit. Note that the distribution ratios of light to the imaging optical unit 30 and the imaging optical unit by the dichroic mirror 92 may be the same ratio (for example, 50% and 50%) or different ratios. Therefore, a dichroic mirror may be used instead of the semi-transparent mirror 28.

The light transmitted through the dichroic mirror 92 reaches the imaging optical unit 30. The light reflected by the dichroic mirror 92 reaches a focus detection unit 36.

Note that it is based on the premise that light (linear illumination LA and area illumination LB) emitted from the light source unit 18 and the measurement target region 25 have an optically conjugate relationship. Furthermore, it is based on the premise that the light source 18B, the measurement target region 25, an imaging sensor 34 of the imaging optical unit 30, and a pupil-separated image imaging sensor 42 of the focus detection unit 36 have an optical conjugate relationship. That is, it is based on the premise that the measurement unit 14 is a coaxial epi-illumination type microscope optical system.

The imaging optical unit 30 includes an opening member 35, an image forming lens 32, an imaging sensor 34, and a second drive unit 45. The opening member 35 is a plate-shaped member having a two-dimensional plane parallel to a cross section orthogonal to the optical axis direction of the light emitted from the measurement target region 25. The opening member 35 has a slit 37. The slit 37 is an opening parallel to the longitudinal direction of the light emitted from the measurement target region 25 by the linear illumination LA.

Figure 3A:
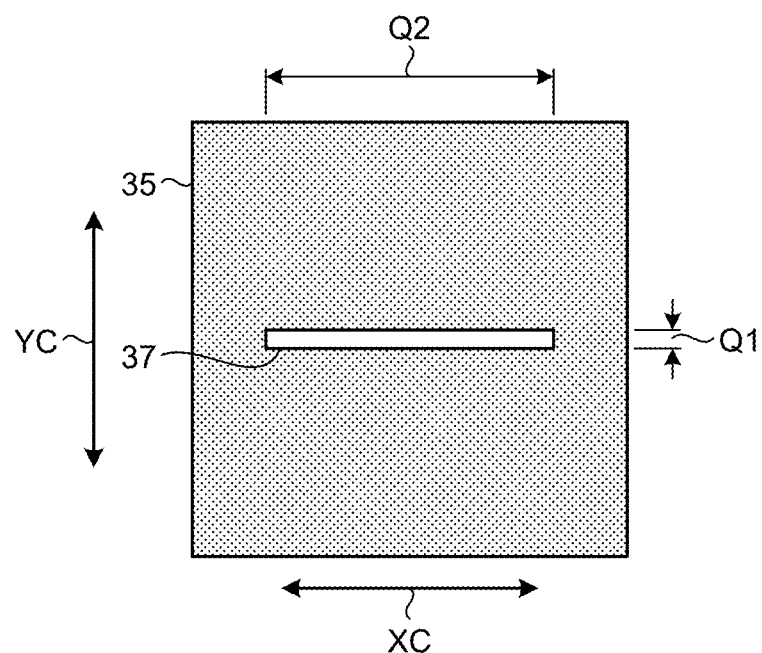
FIG. 3A is a schematic diagram of an example of an opening member according to the first embodiment of the present disclosure.
Figure 3B:
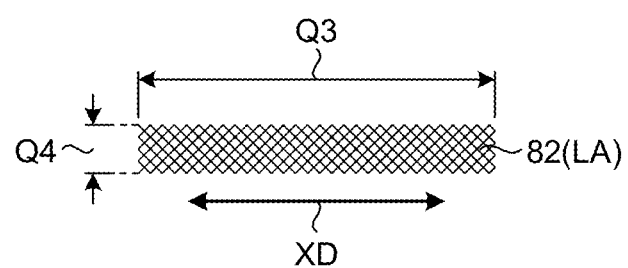
FIG. 3B is an explanatory diagram of an irradiation region according to the first embodiment of the present disclosure.

FIG. 3A is a schematic diagram of an example of the opening member 35. FIG. 3A is a plan view of the opening member 35 as viewed from the incident plane side of the light emitted from the measurement target region 25. FIG. 3B is an explanatory diagram of an irradiation region 82 of the light emitted from the measurement target region 25 by the linear illumination LA in the opening member 35.

The size of the slit 37 depends on the size of the imaging sensor 34. Moreover, the size of the slit 37 is smaller than or equal to that of the irradiation region 82.

Specifically, for example, the size of the slit 37 is 20 mm in length Q2 in the longitudinal direction (for example, arrow XC direction) and 10 μm in length Q1 in the lateral direction (for example, the YC direction). The size of the irradiation region 82 is, for example, 25 mm in length in the longitudinal direction (X-axis direction) and 15 μm in length Q4 in the lateral direction (Y-axis direction). Note that the sizes of the slit 37 and the irradiation region 82 are not limited to the above sizes.

Referring back to FIG. 1, the description will be continued. The light emitted from the measurement target region 25 by irradiation with the linear illumination LA is condensed by the image forming lens 32, condensed to the size of the slit 37, and reaches the imaging sensor 34.

The imaging sensor 34 receives light emitted from the measurement target region 25 and outputs an optical signal. Hereinafter, an optical signal of the light emitted from the measurement target region 25 by the irradiation with the linear illumination LA will be referred to as a first optical signal in the description. Meanwhile, an optical signal of the light emitted from the measurement target region 25 by the irradiation with the area illumination LB will be referred to as a second optical signal in the description. In a case where the first optical signal and the second optical signal are collectively described, they are referred to as optical signals.

The imaging sensor 34 includes a plurality of light receiving units. A light receiving unit is an element that converts received light into electric charges. A light receiving unit is, for example, a photodiode. For example, the imaging sensor 34 has a configuration in which a plurality of light receiving units 33 is two-dimensionally arranged along a light receiving plane.

For example, the imaging sensor 34 has a configuration in which a plurality of light receiving units is arranged along a light receiving plane that receives light. Examples of the imaging sensor 34 include, for example, a complementary metal-oxide semiconductor (CMOS) image sensor, a charge coupled device (CCD) image sensor, an area sensor, or the like.

Note that the imaging sensor 34 may be a color linear sensor in which a plurality of light receiving units is one-dimensionally arranged along the light receiving plane. In this case, the imaging sensor 34 is preferably a color linear sensor. In addition, the imaging sensor 34 is only required to include at least two light receiving units.

In the present embodiment, a spectrum camera (slit 37+spectroscopic optical system+area sensor) including a spectroscopic optical system and a linear sensor (without the slit 37) are presumed as the imaging sensor 34. By the optical system in the imaging sensor 34 that is a spectral camera, light in the short-axis direction of the slit 37 is decomposed into wavelengths by a wavelength dispersion element (prism, diffraction grating), and an optical image having dimensions of a spatial axis and a wavelength axis is received by a two-dimensional sensor.

In the present embodiment, a case where the imaging sensor 34 is an area sensor in which a plurality of light receiving units is two-dimensionally arranged along the light receiving plane will be described as an example.

An optical signal output from the imaging sensor 34 indicates an intensity value of light received by each of the plurality of light receiving units. In other words, the optical signal defines an intensity value of light for each of the plurality of light receiving units. Hereinafter, an intensity value of light may be referred to as a light intensity value in the description. The light intensity value is a value indicating the intensity of received light.

Note that it is based on the premise that the light receiving units of the imaging sensor 34 is provided for every one or a plurality of pixels. In this case, the optical signal is a captured image in which a light intensity value is defined for each pixel corresponding to each of the plurality of light receiving units. In this case, a fluorescence intensity value corresponds to a pixel value.

The imaging sensor 34 outputs the optical signal to the control device 16. In the present embodiment, the imaging sensor 34 outputs the second optical signal to the control device 16 as the optical signal.

In the present embodiment, the imaging optical unit 30 includes the second drive unit 45. The second drive unit 45 modifies a relative position along the optical axis direction of at least one of the plurality of optical components included in the imaging optical unit 30.

In the present embodiment, the second drive unit 45 moves the image forming lens 32 in a direction approaching or away from the imaging sensor 34 along the optical axis of the image forming lens 32. The focus of the image forming lens 32 is adjusted through adjustment of an interval between the image forming lens 32 and the imaging sensor 34 driven by the second drive unit 45. Note that the second drive unit 45 is only required to move the image forming lens 32, and the second drive unit 45 itself may not move.

Note that the second drive unit 45 may move at least one of the image forming lens 32 or the imaging sensor 34 along the optical axis in a direction approaching each other or a direction separating from each other. In the present embodiment, a mode in which the second drive unit 45 moves the image forming lens 32 along the optical axis of the image forming lens 32 will be described as an example.

Next, the imaging optical unit will be described.

The imaging optical unit includes the dichroic mirror 92, an image forming lens 94, and an imaging sensor 96. The dichroic mirror 92 reflects the light emitted from the measurement target region 25.

The image forming lens 94 condenses light emitted from the measurement target region 25 on the imaging sensor 96. Similarly to the imaging sensor 34, the imaging sensor 96 includes a plurality of light receiving units. The imaging sensor 96 is, for example, a CMOS image sensor, a CCD image sensor, or an area sensor.

The imaging sensor 96 outputs an optical signal of the received light to the control device 16. In the present embodiment, the imaging sensor 96 outputs the first optical signal to the control device 16 as an optical signal.

Figure 4:
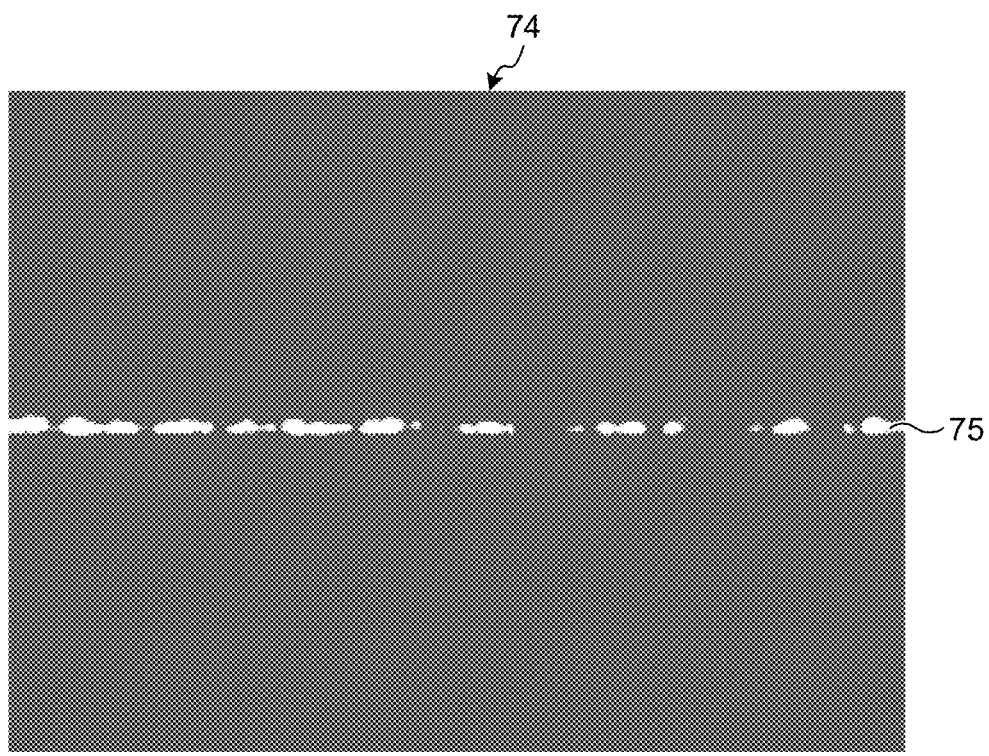
FIG. 4 is a schematic diagram illustrating an example of a first optical signal according to the first embodiment of the present disclosure.

FIG. 4 is a schematic diagram illustrating an example of a first optical signal 74. The first optical signal 74 indicates a light intensity value of the light emitted from the measurement target region 25 by irradiation with the linear illumination LA. In other words, the first optical signal 74 is an image captured by the imaging sensor 96 when the linear illumination LA is emitted to the measurement target region 25. The first optical signal 74 includes light receiving regions 75.

The light receiving region 75 is a region in which a light intensity value is higher or equal to a predetermined value as compared with other regions. As the predetermined value, it is only required to set a threshold value for determining that light has been received. Since the linear illumination LA is linear light, the light receiving region 75 is a linear region parallel to a predetermined direction (arrow XA direction). This predetermined direction is a direction optically corresponding to the X-axis direction which is the longitudinal direction of the linear illumination LA.

Specifically, the vertical axis direction (arrow YA direction) of the first optical signal 74 illustrated in FIG. 4 optically corresponds to the Y axis direction in the measurement target region 25. Meanwhile, the horizontal axis direction (arrow XA direction) of the first optical signal 74 illustrated in FIG. 5 optically corresponds to the X axis direction in the measurement target region 25. As described above, the X-axis direction is the longitudinal direction of the linear illumination LA. Moreover, the depth direction (arrow ZA direction) of the first optical signal 74 illustrated in FIG. 4 optically corresponds to the Z-axis direction that is the thickness direction of the measurement target region 25.

Referring back to FIG. 1, the description will be continued. In the present embodiment, the measurement unit 14 irradiates the measurement target region 25 with the linear illumination LA by scanning with the linear illumination LA along a direction (Y-axis direction) orthogonal to the longitudinal direction (X-axis direction) of the linear illumination LA. That is, in the present embodiment, the Y-axis direction is the scanning direction of the linear illumination LA. The scanning method of the linear illumination LA is not limited. Examples of the scanning method include a method of moving the stage 26 on which the measurement target region 25 is placed in the Y-axis direction by the third drive unit 46 and a method of moving at least a part of the configuration other than the measurement target region 25 in the measurement unit 14 in the Y-axis direction with respect to the measurement target region 25. In addition, a deflection mirror may be disposed between the split mirror 20 and the objective lens 22, and scanning with the linear illumination LA may be performed by the deflection mirror.

By executing imaging by the imaging sensor 34 while scanning the linear illumination LA is performed in the scanning direction, an observation image that is a captured image of the entire measurement target region 25 is obtained. The observation image is a captured image used for analysis of the specimen T and the like.

Next, the control device 16 will be described. The control device 16 is an example of an information processing device. The control device 16 is connected with each of the light source 18B, the first drive unit 44, the imaging sensor 34, the second drive unit 45, the pupil-separated image imaging sensor 42, the third drive unit 46, and the fourth drive unit 47 so as to be able to exchange data or signals.

Figure 5:
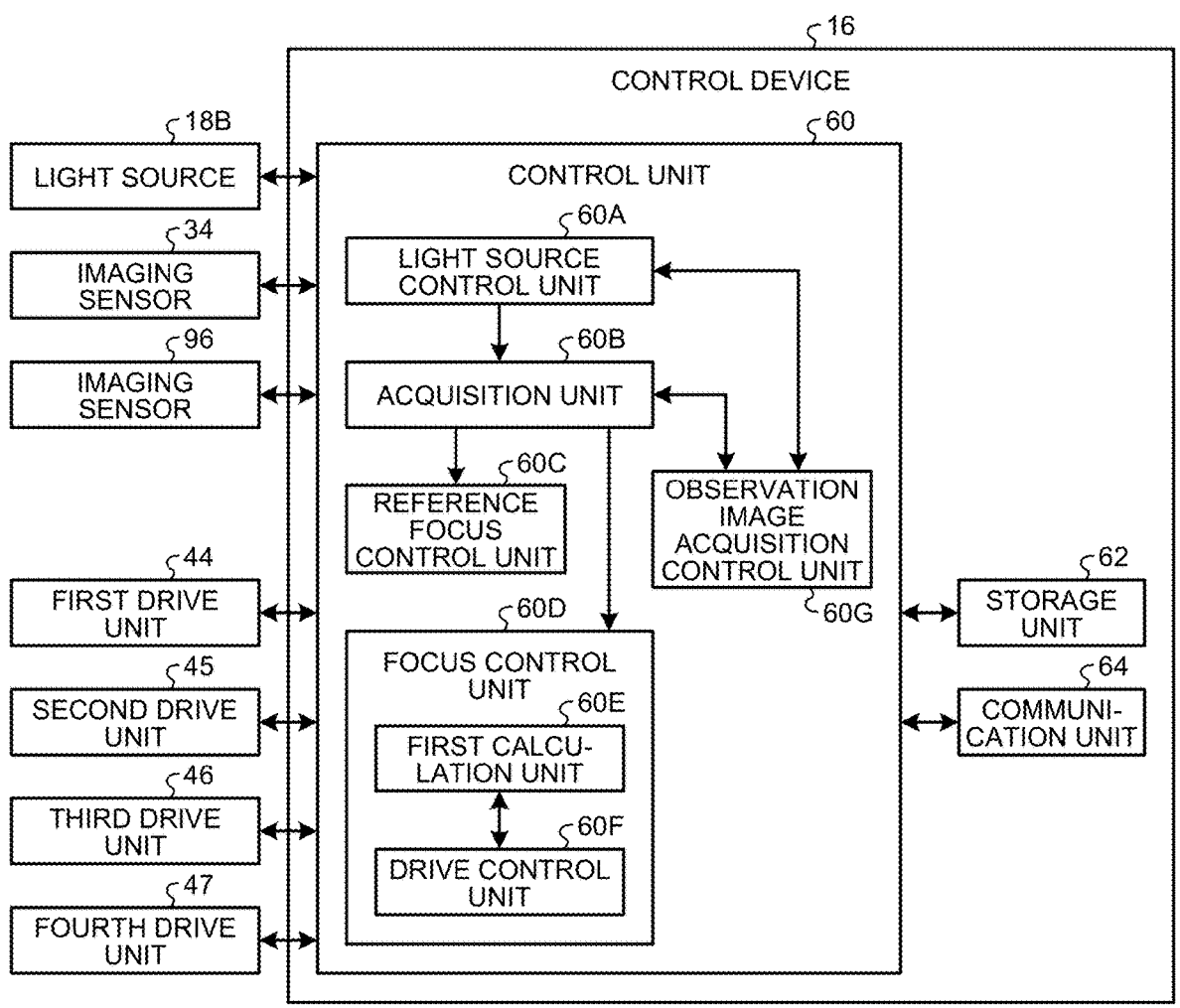
FIG. 5 is a diagram illustrating an example of a functional configuration of a control device according to the first embodiment of the present disclosure.

FIG. 5 is a diagram illustrating an example of a functional configuration of the control device 16. Note that, in FIG. 5, the light source 18B, the imaging sensor 34, the pupil-separated image imaging sensor 42, the first drive unit 44, the second drive unit 45, the third drive unit 46, and the fourth drive unit 47 are also illustrated for the sake of description.

The control device 16 includes a control unit 60, a storage unit 62, and a communication unit 64. The control unit 60, the storage unit 62, and the communication unit 64 are connected so as to be able to exchange data or signals. The storage unit 62 is a storage medium that stores various types of data. The storage unit 62 is, for example, a hard disk drive, an external memory, or the like. The communication unit 64 communicates with an external device such as the server device 10 via the network N or the like.

The control unit 60 includes a light source control unit 60A, an acquisition unit 60B, a reference focus control unit 60C, a focus control unit 60D, a first calculation unit 60E, a drive control unit 60F, and an observation image acquisition control unit 60G.

Some or all of the light source control unit 60A, the acquisition unit 60B, the reference focus control unit 60C, the focus control unit 60D, the first calculation unit 60E, the drive control unit 60F, and the observation image acquisition control unit 60G may be implemented, for example, by causing a processing device such as a central processing unit (CPU) to execute a program, that is, software, may be implemented by hardware such as an integrated circuit (IC), or may be implemented by using software and hardware in combination.

The light source control unit 60A controls the light source 18B so as to selectively emit the linear illumination LA or the area illumination LB. Under the control by the light source control unit 60A, the linear illumination LA or the area illumination LB is selectively emitted from the light source 18B.

The acquisition unit 60B acquires the first optical signal 74 from the imaging sensor 96 and acquires the second optical signal from the imaging sensor 34.

The reference focus control unit 60C adjusts the initial relative position between the objective lens 22 and the measurement target region 25. The relative position between the objective lens 22 and the measurement target region 25 is the relative position of either one of the objective lens 22 and the measurement target region 25 with respect to the other. This relative position is determined by, for example, a distance in the Z-axis direction between the objective lens 22 and the measurement target region 25.

The initial relative position means a relative position for pre-adjustment before obtaining a captured image used for analysis or the like of the specimen T included in the measurement target region 25. That is, the reference focus control unit 60C executes reference focus processing for pre-adjustment.

The reference focus control unit 60C adjusts the focus of the objective lens 22 by a contrast method using the second optical signal acquired by the acquisition unit 60B. Specifically, the reference focus control unit 60C executes the reference focus processing by using the second optical signal indicating a light intensity value of light emitted from the calibration region 27 in the measurement target region 25 by irradiation with the area illumination LB. The reference focus control unit 60C calculates a contrast ratio of a light intensity value among adjacent pixels included in the second optical signal. Then, the reference focus control unit 60C repeats the control by the fourth drive unit 47 and the calculation of the contrast ratio. The reference focus control unit 60C adjusts the initial relative position of the objective lens 22 to a position where the contrast ratio is maximized.

Note that the reference focus control unit 60C may adjust the focus of the objective lens 22 by the contrast method using the first optical signal 74.

Next, the focus control unit 60D will be described.

The focus control unit 60D modifies at least one of a relative position or a relative posture of at least one selected from the light source unit 18, the imaging unit 31, and at least one of a plurality of optical components included in at least one of the light source unit 18 or the imaging unit 31 on the basis of a light intensity distribution of the first optical signal 74.

To modify the relative position means to modify the relative position of at least one of the optical components with respect to at least one of other optical components. The relative position is defined by, for example, a distance in a direction along the optical axis direction, relative position coordinates of one optical component with respect to another optical component, and the like. To modify the relative posture means to modify the relative posture of at least one of the optical components with respect to at least one of other optical components. The relative posture is represented by, for example, a rotation angle from the current posture, a relative angle with respect to another optical component, and the like.

In the present embodiment, a case where the focus control unit 60D modifies the relative position of at least one a plurality of optical components included in at least one of the light source unit 18 or the imaging optical unit 30 will be described as an example.

The focus control unit 60D includes the first calculation unit 60E and the drive control unit 60F.

The first calculation unit 60E calculates a distribution width of the light intensity distribution of the first optical signal 74.

Figure 6A:
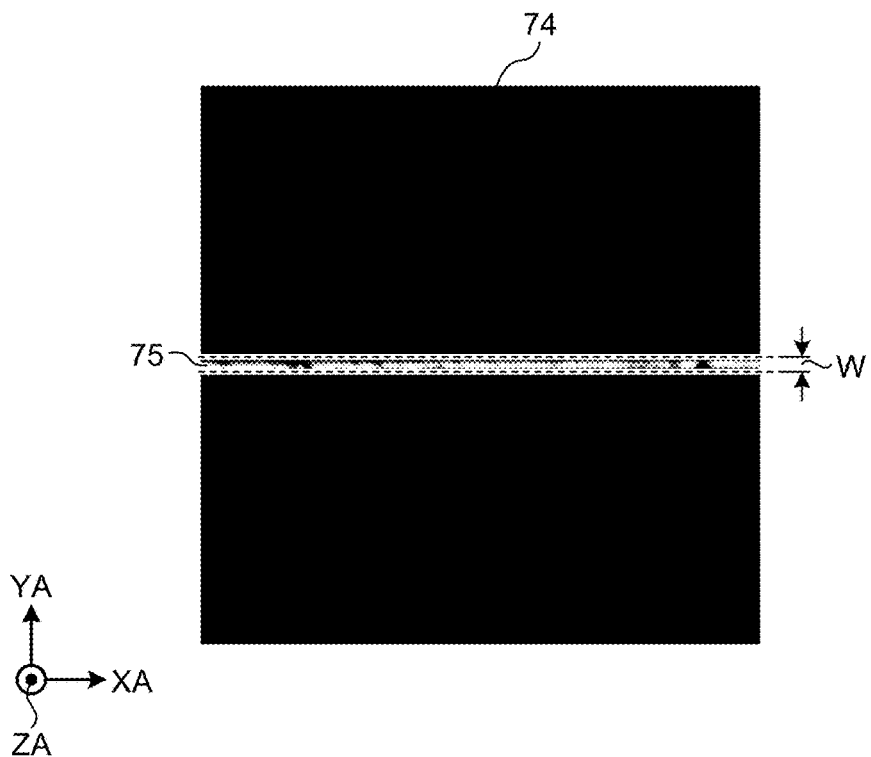
FIG. 6A is an explanatory diagram of a distribution width of a light intensity distribution of the first optical signal according to the first embodiment of the present disclosure.

FIG. 6A is an explanatory diagram of a distribution width W of the light intensity distribution of the first optical signal 74. As described with reference to FIG. 4, the first optical signal 74 includes the light receiving region 75 of a linear shape corresponding to the area illumination LB. In the present embodiment, the first calculation unit 60E calculates the width of the light receiving region 75 as the distribution width W. The width of the light receiving region 75 is the length in a direction (arrow YA direction) orthogonal to the longitudinal direction (arrow XA direction) of the light receiving region 75.

Figure 6B:
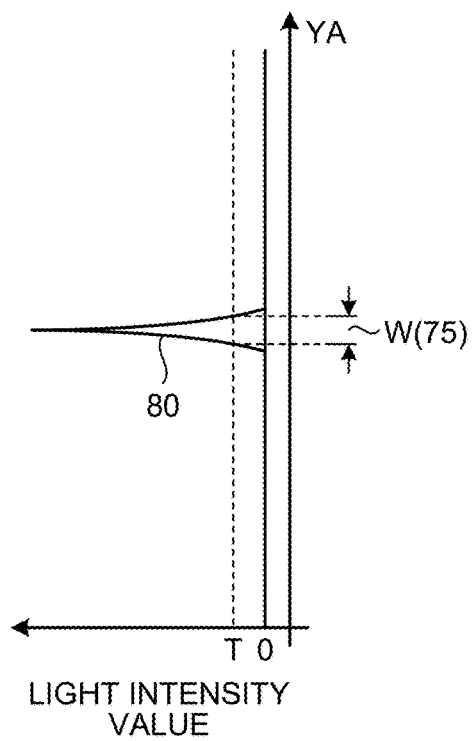
FIG. 6B is a line chart illustrating an example of the light intensity distribution of the first optical signal according to the first embodiment of the present disclosure.

FIG. 6B is a line chart illustrating an example of a light intensity distribution 80 of the first optical signal 74. In FIG. 6B, the vertical axis represents the position of the first optical signal 74 in the arrow YA direction, and the horizontal axis represents the light intensity value. For example, the first calculation unit 60E specifies a region having a light intensity value larger than or equal to a threshold value T in the light intensity distribution 80 of the first optical signal 74 as the light receiving region 75 and calculates the width of the light receiving region 75 in the arrow YA direction as the distribution width W. The threshold value T is only required to be determined in advance.

Referring back to FIG. 5, the description will be continued. The drive control unit 60F moves at least one of a plurality of optical components included in at least one of the light source unit 18 or the imaging optical unit 30 to a relative position where the distribution width W is less than or equal to a first threshold value. In the present embodiment, a mode in which the drive control unit 60F moves the light source focus lens 18D included in the light source unit 18 to a relative position where the distribution width W is less than or equal to the first threshold value will be described as an example.

Here, when the relative position of the light source focus lens 18D with respect to the light source 18B changes, the distribution width W of the light intensity distribution 80 of the first optical signal 74 also changes.

FIG. 7 is a line chart illustrating an example of a relationship between the relative position of the light source focus lens 18D and the number of pixels indicating the distribution width W. In FIG. 7, illustrated is the change in the distribution width W of the first optical signal 74 obtained by the imaging sensor 34 at each stage, which was obtained by changing the distance between the light source focus lens 18D and the light source 18B stepwise from a short distance to a long distance. As illustrated in FIG. 7, the distribution width W changes with a change in the relative position of the light source focus lens 18D.

FIG. 8 is a schematic diagram illustrating an example of the first optical signal 74. The first optical signal 74 (first optical signal 74A to first optical signal 74C) illustrated in FIG. 8 is an example of the first optical signal 74 detected in each step when the distance between the light source focus lens 18D and the light source 18B is decreased stepwise from the first optical signal 74A to the first optical signal 74C. The first optical signal 74B is an example of the first optical signal 74 during focusing.

Specifically, in FIG. 7, the first optical signal 74A is an example of the first optical signal 74 when the relative position of the light source focus lens 18D is at position PA. In FIG. 7, the first optical signal 74B is an example of the first optical signal 74 when the relative position of the light source focus lens 18D is at position PB. In FIG. 7, the first optical signal 74C is an example of the first optical signal 74 when the relative position of the light source focus lens 18D is at position PC.

As illustrated in FIGS. 7 and 8, the distribution width W increases as the distance between the light source 18B and the light source focus lens 18D increases. The distribution width W also becomes wider as the distance between the light source 18B and the light source focus lens 18D becomes shorter.

Therefore, the drive control unit 60F moves the light source focus lens 18D to a relative position where the distribution width W is less than or equal to the first threshold value. The drive control unit 60F moves the light source focus lens 18D to the relative position by controlling the first drive unit 44 to move the light source focus lens 18D in the direction of the optical axis A. The first threshold value is only required to be determined in advance.

For example, the drive control unit 60F modifies the distance between the light source 18B and the light source focus lens 18D stepwise by driving and controlling the first drive unit 44 included in the light source unit 18. The first calculation unit 60E calculates the distribution width W of the first optical signal 74 acquired in each step. Then, the drive control unit 60F repeats moving the light source focus lens 18D, acquiring the first optical signal 74, and calculating the distribution width W for a predetermined number of times N. The number of repetitions N is only required to be an integer greater than or equal to 3. The number of repetitions N is only required to be set in advance. Then, the drive control unit 60F may set the minimum value of the distribution width W of the first optical signal 74 acquired in each of the N repetitions as the first threshold value. In this case, the drive control unit 60F specifies the relative position of the light source focus lens 18D as of the time when the first optical signal 74 having the minimum distribution width W is acquired. Then, the drive control unit 60F moves the light source focus lens 18D to the specified relative position by driving and controlling the first drive unit 44.

Through these pieces of processing, the drive control unit 60F can move the light source focus lens 18D to a position where an image of the light emitted from the measurement target region 25 is focused on the imaging sensor 34.

Referring back to FIG. 5, the description will be continued. The observation image acquisition control unit 60G acquires an observation image. As described above, an observation image is a captured image used for analysis of the specimen T or the like. The observation image acquisition control unit 60G moves the stage 26 stepwise in the Y-axis direction by driving the third drive unit 46. By the movement of the stage 26, the linear illumination LA with which the measurement target region 25 placed on the stage 26 is irradiated is scanned in the scanning direction (Y-axis direction). The observation image acquisition control unit 60G acquires an observation image that is a captured image of the entire measurement target region 25 by repeatedly executing scanning with the linear illumination LA in the scanning direction and imaging by the imaging sensor 34. That is, the drive control unit 60F acquires the observation image by acquiring the first optical signal 74 at each scanning position in the scanning direction.

Note that the observation image acquisition control unit 60G may control the light source unit 18A so as to emit the area illumination LB at the time of acquiring the observation image. In this case, the observation image acquisition control unit 60G acquires the observation image by acquiring the second optical signal.

Here, when the observation image is acquired by the observation image acquisition control unit 60G, the light source focus lens 18D is in a state of being moved to a position where the image of the light emitted from the measurement target region 25 is focused on the imaging sensor 34 by the focus control unit 60D. Therefore, the observation image acquisition control unit 60G can acquire an observation image in which the focus is adjusted.

The observation image acquisition control unit 60G outputs the acquired observation image to an external device such as the server device 10 via the communication unit 64. Note that the observation image acquisition control unit 60G may store the acquired observation image in the storage unit 62. In addition, the observation image acquisition control unit 60G may output the observation image to a display connected to the control unit 60.

In addition, the observation image acquisition control unit 60G may analyze the type or the like of the specimen T by analyzing the acquired observation image by a known method and output the analysis result to the server device 10 or the like.

Next, an example of a flow of information processing executed by the control device 16 according to the present embodiment will be described.

FIG. 9 is a flowchart illustrating an example of a flow of information processing executed by the control device 16. Note that it is based on the premise that the measurement target region 25 including the measurement target member 24 including the specimen T and the calibration region 27 is placed before the control device 16 executes the following information processing. The placement of the measurement target region 25 onto the stage 26 may be performed manually or may be automatically controlled using a loader, a manipulator, or the like.

First, the control unit 60 drives and controls the third drive unit 46 so that the calibration region 27 is located within the imaging region of the imaging unit 31. By this drive control, the calibration region 27 is moved into the imaging region of the imaging unit 31 (step S100).

Next, the light source control unit 60A controls the light source 18B so as to turn off the linear illumination LA and to turn on the area illumination LB (step S102).

The acquisition unit 60B acquires the second optical signal from the imaging sensor 34 (step S104).

The reference focus control unit 60C executes reference focus processing using the second optical signal acquired in step S104 (step S106). In step S106, the reference focus control unit 60C adjusts the initial relative position of the objective lens 22 to a position where the contrast ratio is maximized by the contrast method.

Next, the light source control unit 60A controls the light source 18B so as to turn off the area illumination LB and to turn on the linear illumination LA (step S108).

The acquisition unit 60B acquires the first optical signal 74 from the imaging sensor 34 (step S116). The first calculation unit 60E of the focus control unit 60D calculates the distribution width W of the first optical signal 74 acquired in step S110 (step S112).

The drive control unit 60F moves the light source focus lens 18D by a predetermined distance along the optical axis A1 by driving and controlling the first drive unit 44 (step S114).

The acquisition unit 60B acquires the first optical signal 74 captured in a state where the light source focus lens 18D has been moved by the processing in step S114 or step S122 to be described later from the imaging sensor 34 via the acquisition unit 60B (step S116).

The first calculation unit 60E calculates the distribution width W of the first optical signal 74 acquired in step S116 (step S118).

The drive control unit 60F determines whether or not the distribution width W calculated in step S118 is narrower than the initial distribution width that is the distribution width W calculated in step S116 (step S120).

If negative determination is made in step S120 (step S120: No), the process proceeds to step S122. In step S122, the drive control unit 60F moves the light source focus lens 18D by a predetermined distance along the optical axis A1 in a direction opposite to the moving direction in step S114 (step S122). Then, the process returns to step 114 described above.

If affirmative determination is made in step S120 (step S120: Yes), the process proceeds to step S124. The drive control unit 60F determines whether or not the processing of steps S114 to S120 have been repeated a predetermined number of times N (step S124).

If negative determination is made in step S124 (step S124: No), the process returns to step S114. If affirmative determination is made in step S124 (step S124: Yes), the process proceeds to step S126.

In step S126, the drive control unit 60F moves the light source focus lens 18D to a position of a minimum distribution width that is a minimum value of the distribution width W of the first optical signal 74 acquired in each of the above-described N repetitions (step S126). That is, the drive control unit 60F moves the light source focus lens 18D to the relative position of the light source focus lens 18D as of the time when the first optical signal 74 having the distribution width W of the minimum value has been acquired.

By the processing in step S126, the light source focus lens 18D is placed at a position where the image of the light emitted from the measurement target region 25 is focused on the imaging sensor 34.

Next, the observation image acquisition control unit 60G acquires an observation image. Specifically, the observation image acquisition control unit 60G moves the stage 26 to an initial position in the scanning direction (Y-axis direction) of the linear illumination LA (step S128) by driving the third drive unit 46. The initial position is a region deviated from the calibration region 27, that is, a region where the specimen T is present. By this drive control, the measurement target region 25 where the specimen T is present is moved into the imaging regions of the imaging unit 31 and the imaging optical unit.

Next, the observation image acquisition control unit 60G acquires an observation image for one scanning line by acquiring the first optical signal 74 from the imaging sensor 96 (step S130).

The observation image acquisition control unit 60G determines whether or not the first optical signals 74 for all scanning lines in the measurement target member 24 have been acquired (step S132). If negative determination is made in step S132 (step S132: No), the process proceeds to step S134.

In step S134, the observation image acquisition control unit 60G controls the third drive unit 46 so as to move the irradiation region of the linear illumination LA in a scanning direction (Y-axis direction) by one step (step S134). Then, the process returns to step S130 described above.

If affirmative determination is made in step S132 (step S132: Yes), the process proceeds to step S136. In step S136, the observation image acquisition control unit 60G outputs the observation image, which is a plurality of first optical signals 74 at respective scanning positions in the scanning direction, to the server device 10 via the communication unit 64 (step S136). Then, this routine ends.

Note that the processing in steps S102 to S128 may be performed every time an observation image is acquired or may be performed once before the plurality of observation images is acquired. Furthermore, in a case where the processing of steps S102 to S128 is executed each time one of the plurality of observation images is acquired, the frequency of the drive control of the light source focus lens 18D may be reduced as the number of times of execution increases.

As described above, the microscope system 1 of the present embodiment includes the light source unit 18, the objective lens 22, the acquisition unit 60B, and the focus control unit 60D. The light source unit 18A emits the linear illumination LA parallel to the first direction. The objective lens 22 condenses the linear illumination LA on the measurement target region 25. The acquisition unit 60B acquires the first optical signal 74 indicating the light intensity value of the light emitted from the measurement target region 25 by the linear illumination LA from the imaging unit 31 that images an optical signal. The focus control unit 60D modifies at least one of the relative position or the relative posture of at least one of a plurality of optical components included in at least one of the light source unit 18 or the imaging unit 31 on the basis of the light intensity distribution 80 of the first optical signal 74.

Here, there are cases where the intensity of the linear illumination LA emitted from the light source unit 18 or the optical distance between the light source unit 18 and the imaging sensor 34 fluctuates due to fluctuations of the environmental temperature or the like.

In the related art, in a case where the characteristics of a specimen included in a measurement target region are examined by optical wavelength characteristics that have been measured, there is a possibility that the intensity fluctuation may lead to a detection error. In addition, there are cases where the light emitted from the measurement target region 25 by the irradiation with the linear illumination is not focused on the imaging sensor 34 and the light utilization efficiency decreases.

On the other hand, the microscope system 1 of the present embodiment modifies at least one of the relative position or the relative posture of at least one of optical components, other than the objective lens 22, on the basis of the light intensity distribution 80 of the first optical signal 74 of the light emitted from the measurement target region 25 by the irradiation with the linear illumination LA.

The light source unit 18 is a unit that emits the linear illumination LA caused by fluctuations in intensity or the optical distance. Furthermore, the imaging unit 31 is a unit that receives light emitted from the measurement target region 25 by irradiation with the linear illumination LA. Therefore, the detection error can be suppressed by modifying at least one of the relative position or the relative posture of at least one of a plurality of optical components included in at least one of the light source unit 18 or the imaging optical unit 30.

Therefore, the microscope system 1 of the present embodiment can suppress detection errors.

In addition, in the microscope system 1 of the present embodiment, a focus deviation caused by fluctuation of the environmental temperature or the like is adjusted through adjustment of the relative position of at least one of a plurality of optical components included in at least one of the light source unit 18 or the imaging optical unit 30. Therefore, it is not necessary to mount a precise adjustment fixing mechanism or a temperature adjustment system for performing temperature correction on the light source unit 18. Therefore, in addition to the above effects, the microscope system 1 of the present embodiment can suppress a decrease in the utilization efficiency of light with a simple configuration.

In addition, the microscope system 1 of the present embodiment uses the measurement target region 25 including the calibration region 27 as the measurement target region 25. Then, the microscope system 1 modifies the relative position and the relative posture of at least one of a plurality of optical components included in at least one of the light source unit 18 or the imaging unit 31 on the basis of the light intensity distribution 80 of the first optical signal 74 of the light emitted from the calibration region 27 by the irradiation with the linear illumination LA.

Therefore, a microscope system 1C of the present embodiment can perform focus adjustment with high accuracy in addition to the above effects.

In addition, in the microscope system 1 of the present embodiment, in addition to the above effects, it is possible to reduce the power consumption, to suppress exhaustion of the light source 18B, to reduce cost, and the like.

Second Embodiment

In the present embodiment, an imaging unit 31 is included instead of the imaging optical unit. Furthermore, in the present embodiment, a mode will be described in which the relative position and the relative posture of at least one of a plurality of optical components included in at least one of the light source unit 18 or the imaging unit 31 are modified.

Figure 10:
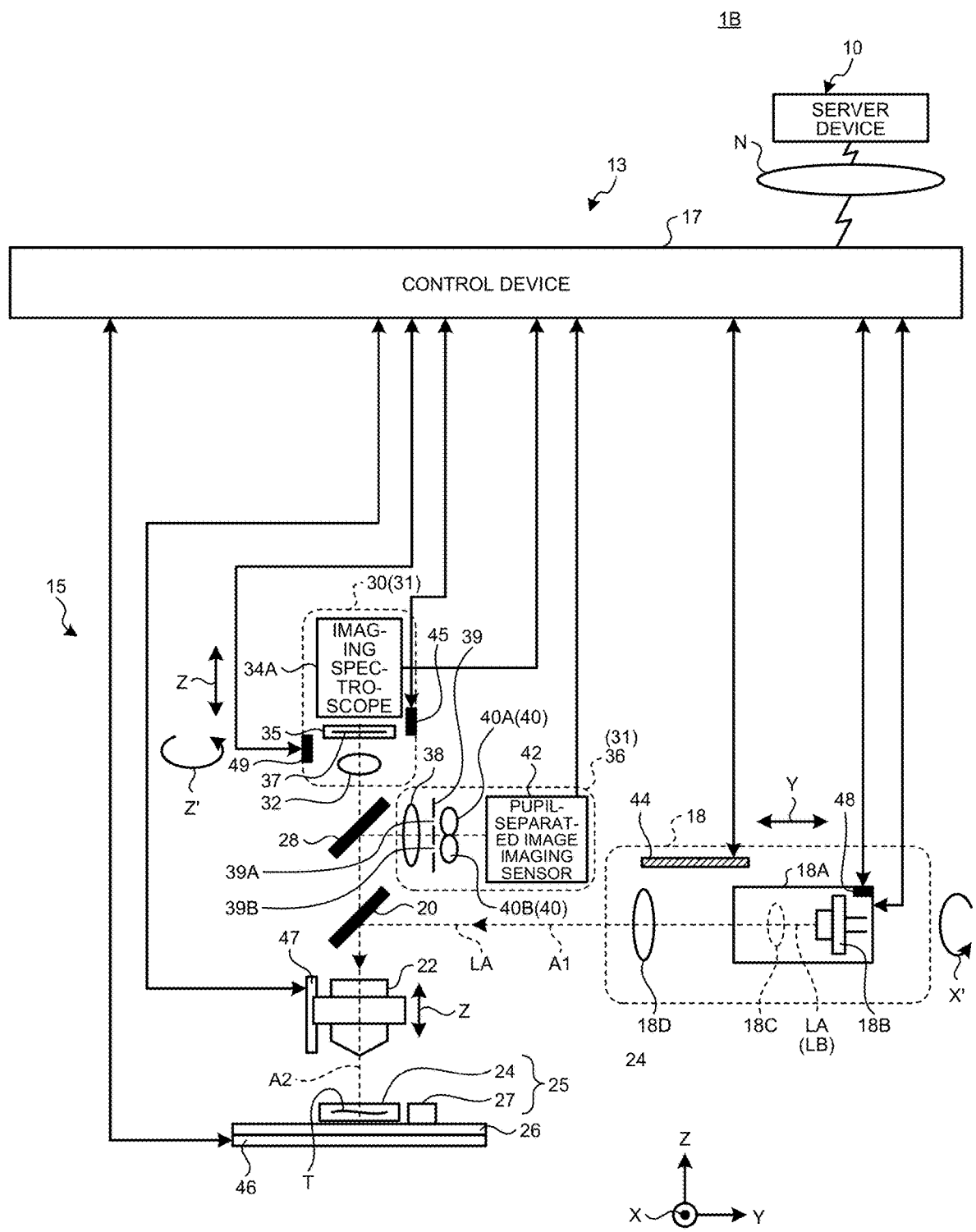
FIG. 10 is a schematic diagram illustrating an example of a microscope system according to a second embodiment of the present disclosure.

FIG. 10 is a schematic diagram illustrating an example of a microscope system 1B of the present embodiment. Note that the same functions or components as those in the above embodiment are denoted by the same symbols, and redundant description will be omitted.

The microscope system 1B includes an imaging device 13. The imaging device 13 is communicably connected to a server device 10 via, for example, a wireless communication network such as a network N or a wired communication network. The imaging device 13 includes a control device 17 and a measurement unit 15.

The measurement unit 15 has an optical mechanism that measures light emitted from a measurement target region 25. The measurement unit 15 is applied to, for example, an optical microscope.

The measurement unit 15 includes a fifth drive unit 48 and a sixth drive unit 49 in addition to the configuration of the measurement unit 14 of the first embodiment. In addition, the measurement unit 15 includes a focus detection unit 36 instead of the imaging optical unit. That is, in the present embodiment, the imaging unit 31 includes an imaging optical unit 30 and the focus detection unit 36. Furthermore, in the present embodiment, the imaging optical unit 30 includes an imaging spectroscope 34A instead of the imaging sensor 34.

The fifth drive unit 48 modifies a presumed posture of at least one of a plurality of optical components included in the light source unit 18. To modify the relative posture means to modify the relative posture of at least one of the optical components with respect to at least one of other optical components. The relative posture is represented by, for example, a rotation angle from the current posture, a relative angle with respect to another optical component, and the like.

In the present embodiment, the fifth drive unit 48 rotates the entire light source 18B about the optical axis A1 of the light source focus lens 18D as a rotation center. For example, a mode in which the fifth drive unit 48 rotates the light source 18B in the rotation direction (direction of arrow X') as illustrated in FIG. 10 will be described as an example. The orientation in the longitudinal direction of the linear illumination LA emitted from the light source 18B is modified by the rotation of the light source 18B.

The sixth drive unit 49 modifies the relative posture of at least one of a plurality of optical components included in the imaging optical unit 30.

In the present embodiment, the sixth drive unit 49 drives an opening member 35 to rotate about the optical axis of an image forming lens 32. For example, a mode in which the sixth drive unit 49 rotates the opening member 35 in the rotation direction (direction of arrow z') as illustrated in FIG. 10 will be described as an example. The orientation in the longitudinal direction of the slit 37 included in the opening member 35 is modified by the rotational drive of the opening member 35.

Next, the focus detection unit 36 will be described. The focus detection unit 36 is an optical unit that divides light emitted from the measurement target region 25 irradiated with the linear illumination LA into a plurality of (two or more) optical paths and obtains a phase difference between images that are obtained. In the present embodiment, a case where the focus detection unit 36 is an optical unit for obtaining a binocular pupil-separated image obtained by dividing the pupils into two using two separator lenses will be described as an example.

The focus detection unit 36 includes a field lens 38, a diaphragm mask 39, a separator lens 40 including a separator lens 40A and a separator lens 40B, and a pupil-separated image imaging sensor 42. The separator lens 40 includes the separator lens 40A and the separator lens 40B.

The light emitted from the measurement target region 25 by the irradiation with the linear illumination LA passes through an objective lens 22 and a split mirror 20 and reaches a semi-transparent mirror 28.

The semi-transparent mirror 28 distributes a part of the light emitted from the measurement target region 25 to the imaging optical unit 30 and the rest of the light to the focus detection unit 36. Note that the distribution ratios of light to the imaging optical unit 30 and the focus detection unit 36 by the semi-transparent mirror 28 may be the same ratio (for example, 50%, 50%) or may be different ratios. Therefore, a dichroic mirror may be used instead of the semi-transparent mirror 28.

The light transmitted through the semi-transparent mirror 28 reaches the imaging optical unit 30. The light reflected by the semi-transparent mirror 28 reaches the focus detection unit 36.

That is, the light emitted from the measurement target region 25 by the irradiation with the linear illumination LA reaches the diaphragm mask 39 via the field lens 38. The diaphragm mask 39 has a pair of openings 39A and 39B at positions symmetrical with respect to the optical axis of the field lens 38. The sizes of the pair of openings 39A and 39B are adjusted so that the depths of field of the separator lens 40A and the separator lens 40B are wider than the depth of field of the objective lens 22.

The diaphragm mask 39 divides light incident from the field lens 38 into two light fluxes by the pair of openings 39A and 39B. The separator lens 40A and the separator lens 40B condense the light fluxes transmitted through the openings 39A and 39B, respectively, of the diaphragm mask 39 to the pupil-separated image imaging sensor 42. Therefore, the pupil-separated image imaging sensor 42 receives the two light fluxes that have been divided.

Note that the focus detection unit 36 may not include the diaphragm mask 39. In this case, light that has reached the separator lens 40 via the field lens 38 is divided into two light fluxes by the separator lens 40A and the separator lens 40B, which are condensed to the pupil-separated image imaging sensor 42.

The pupil-separated image imaging sensor 42 receives the two light fluxes that have been divided. The pupil-separated image imaging sensor 42 captures pupil-separated images including a set of light flux images and outputs a pupil-separated captured image to the control device 17.

Figure 11:
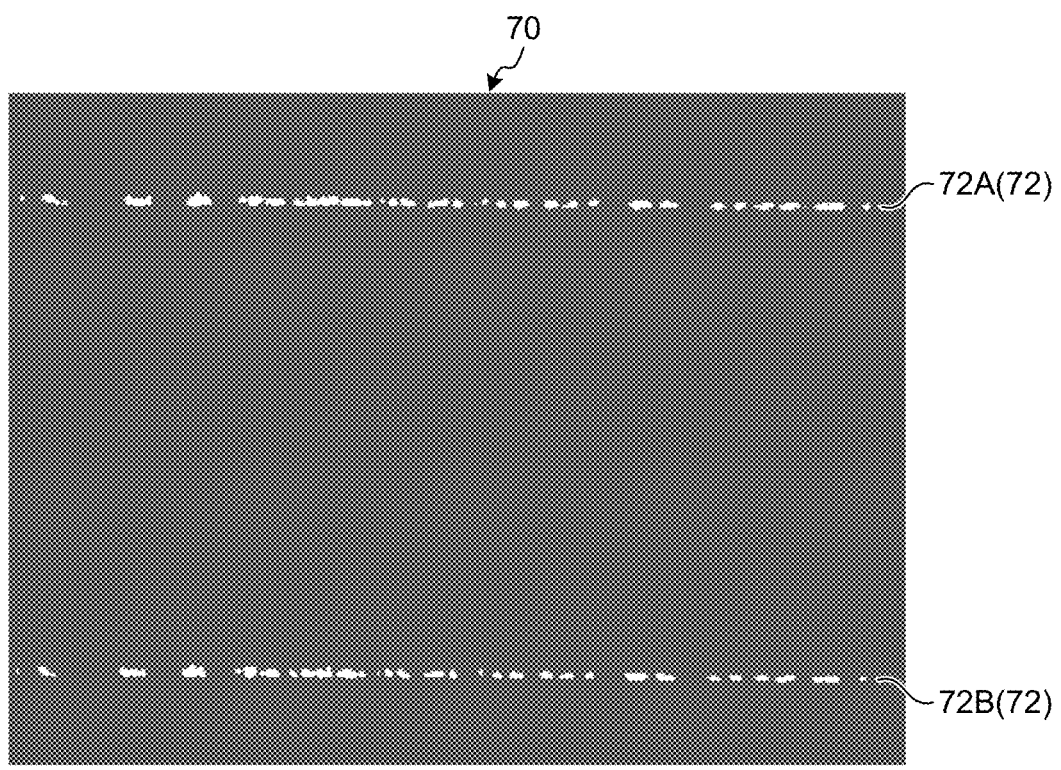
FIG. 11 is a schematic diagram illustrating an example of a pupil-separated captured image according to the first embodiment of the present disclosure.

FIG. 11 is a schematic diagram illustrating an example of a pupil-separated captured image 70. The pupil-separated captured image 70 includes a pupil-separated image 72 including a set of image 72A and image 72B.

The pupil-separated captured image 70 corresponds to the position and brightness of light received by each of the plurality of light receiving units 41 included in the pupil-separated image imaging sensor 42. Hereinafter, the brightness of the light received by the light receiving unit 41 may be referred to as a light intensity value in the description. The image 72A and the image 72B included in the pupil-separated captured image 70 are light receiving regions and are regions having a larger light intensity value as compared to other regions. Moreover, as described above, the light source unit 18 irradiates the measurement target region 25 with the linear illumination LA. Therefore, the light emitted from the measurement target region 25 irradiated with the linear illumination LA is linear light. Therefore, the image 72A and the image 72B included in the pupil-separated images 72 are linear images parallel to a predetermined direction. This predetermined direction is a direction optically corresponding to the X-axis direction which is the longitudinal direction of the linear illumination LA.

Note that the focus detection unit 36 only needs to be an optical unit for obtaining the pupil-separated images 72, and the pupil-separated images obtained are not limited to binocular pupil-separated images. The focus detection unit 36 may be, for example, an optical unit that obtains, at least a trinocular, pupil-separated image by dividing light emitted from a specimen T into three or more light fluxes and receiving the light fluxes.

As described above, in the present embodiment, the imaging optical unit 30 includes the imaging spectroscope 34A instead of the imaging sensor 34. Similarly to the imaging sensor 34, the imaging spectroscope 34A receives the light emitted from the measurement target region 25 and outputs an optical signal. The imaging spectroscope 34A outputs a spectral image as the optical signal. In the present embodiment, a first optical signal 74 is a captured image by the imaging spectroscope 34A when the linear illumination LA is applied to the measurement target region 25.

Next, the control device 17 will be described.

The control device 17 is an example of an information processing device. The control device 17 is connected with each of the light source 18B, a first drive unit 44, the imaging spectroscope 34A, a second drive unit 45, a third drive unit 46, a fourth drive unit 47, the fifth drive unit 48, and the sixth drive unit 49 so as to be able to exchange data or signals.

Figure 12:
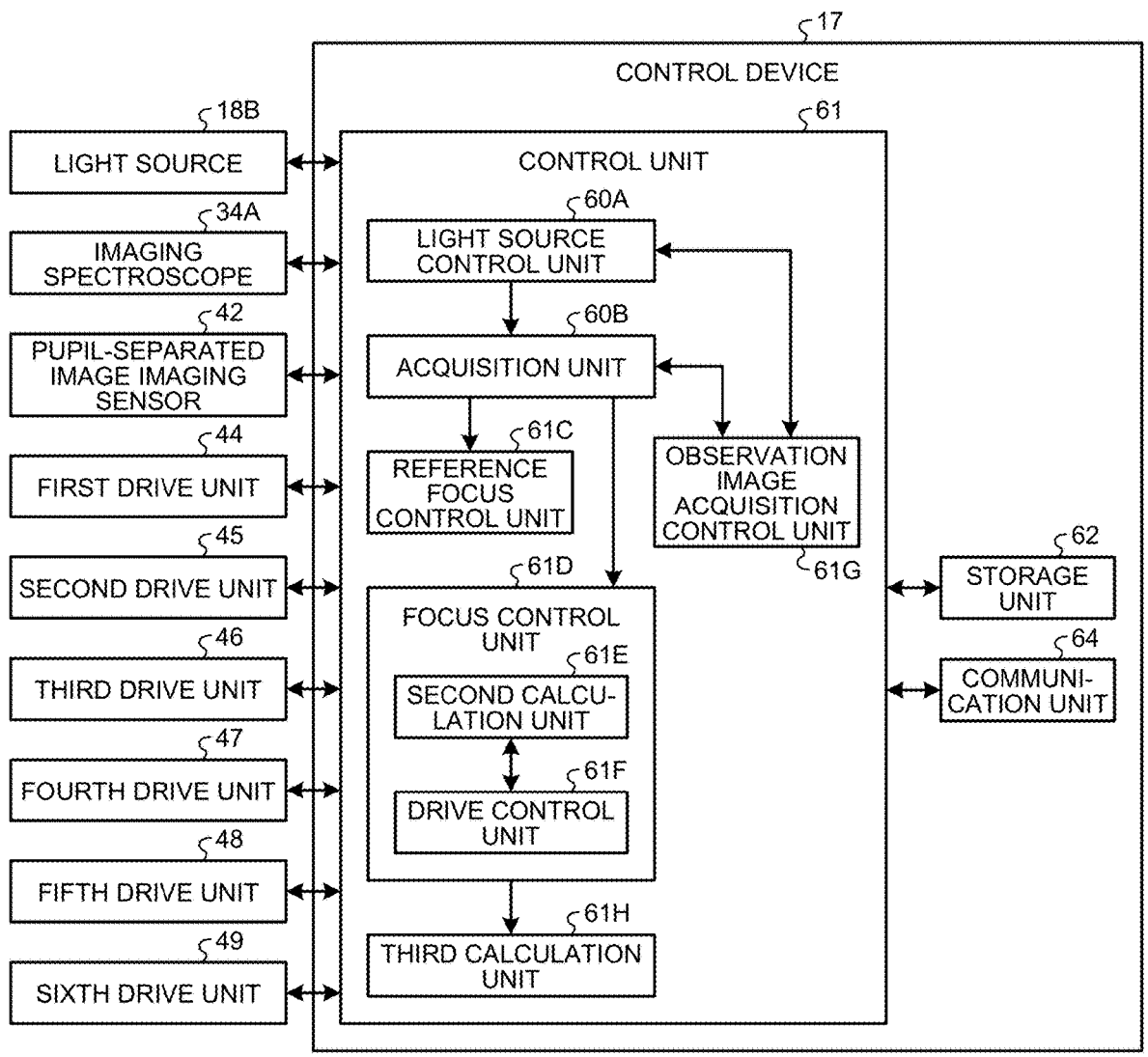
FIG. 12 is a diagram illustrating an example of a functional configuration of a control device according to the second embodiment of the present disclosure.

FIG. 12 is a diagram illustrating an example of the functional configuration of the control device 17. Note that, in FIG. 12, the light source 18B, the imaging spectroscope 34A, the pupil-separated image imaging sensor 42, the first drive unit 44, the second drive unit 45, the third drive unit 46, the fourth drive unit 47, the fifth drive unit 48, and the sixth drive unit 49 are also illustrated for the sake of explanation.

The control device 17 includes a control unit 61, a storage unit 62, and a communication unit 64. The control unit 61, the storage unit 62, and the communication unit 64 are connected so as to be able to exchange data or signals.

The control unit 61 includes a light source control unit 60A, an acquisition unit 60B, a reference focus control unit 61C, a focus control unit 61D, a second calculation unit 61E, a drive control unit 61F, an observation image acquisition control unit 61G, and a third calculation unit 61H.

Some or all of the light source control unit 60A, the acquisition unit 60B, the reference focus control unit 61C, the focus control unit 61D, the second calculation unit 61E, the drive control unit 61F, the observation image acquisition control unit 61G, and the third calculation unit 61H may be implemented, for example, by causing a processing device such as a CPU to execute a program, that is, software, may be implemented by hardware such as an IC, or may be implemented by using software and hardware in combination.

Similarly to the first embodiment, the light source control unit 60A controls the light source 18B to selectively emit the linear illumination LA or the area illumination LB. The acquisition unit 60B acquires the first optical signal 74 or the second optical signal from the imaging spectroscope 34A.

The reference focus control unit 61C executes the reference focus processing similarly to the reference focus control unit 60C of the first embodiment.

Here, it is preferable that the longitudinal direction of the slit 37 and the longitudinal direction of an irradiation region 82 in the opening member 35 coincide with each other. Specifically, as illustrated in FIGS. 3A and 3B of the above embodiment, it is preferable that the longitudinal direction (direction of arrow XC) of the slit 37 and the longitudinal direction (direction of arrow XD) of the irradiation region 82 of the light emitted from the measurement target region 25 by the irradiation with the linear illumination LA in the opening member 35 optically coincide with each other from the viewpoint of utilization efficiency of light and the like. However, there are cases where the longitudinal direction of the slit 37 and the longitudinal direction of the irradiation region 82 do not coincide with each other.

It is also preferable that the slit 37 and the irradiation region 82 overlap with each other over the entire region from one end to the other end in the longitudinal direction of the slit 37 from the viewpoint of utilization efficiency of light and the like.

Figure 13A:
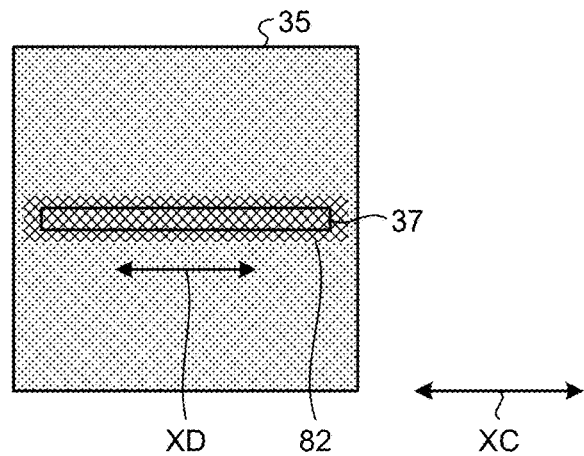
FIG. 13A is an explanatory diagram of the positional relationship between a slit and an irradiation region according to the second embodiment of the present disclosure.
Figure 13B:
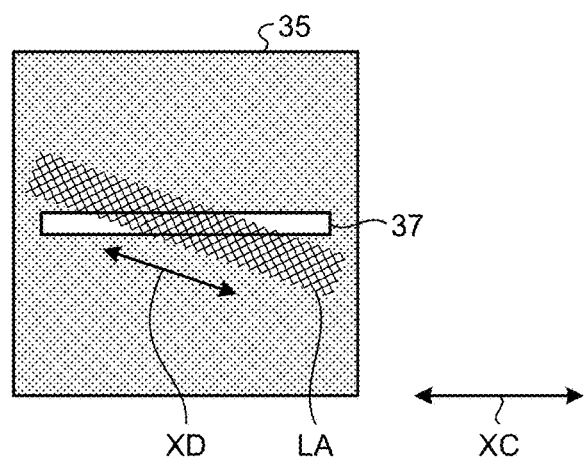
FIG. 13B is an explanatory diagram of the positional relationship between the slit and the irradiation region according to the second embodiment of the present disclosure.
Figure 13C:
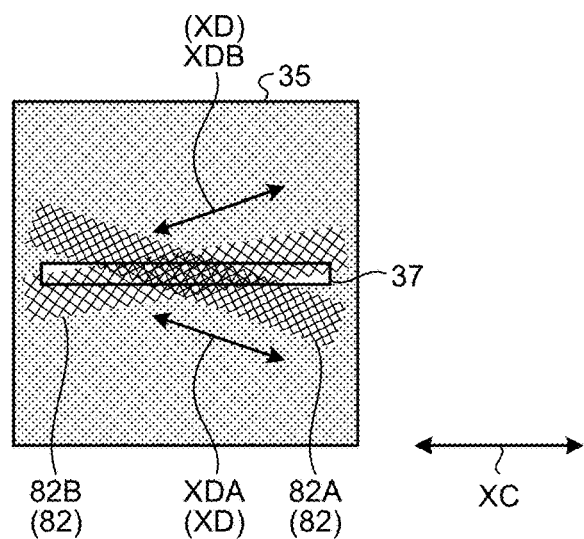
FIG. 13C is an explanatory diagram of the positional relationship between the slit and the irradiation region according to the second embodiment of the present disclosure.

FIGS. 13A, 13B, and 13C are explanatory diagrams of the positional relationship between the slit 37 and the irradiation region 82.

As illustrated in FIG. 13A, it is ideal that the irradiation region 82 of light emitted from the measurement target region 25 by the irradiation with the linear illumination LA in the opening member 35 overlaps the entire region of the slit 37. Specifically, it is ideal that the longitudinal direction (direction of arrow XD) of the irradiation region 82 and the longitudinal direction (direction of arrow XC) of the slit 37 coincide with each other. It is also ideal that the slit 37 and the irradiation region 82 overlap over the entire region from one end to the other end of the slit 37 in the longitudinal direction.

However, as illustrated in FIG. 13B, there are cases where the longitudinal direction of the slit 37 (direction of arrow XC) do not coincide with the longitudinal direction (direction of arrow XD) of the irradiation region 82. In this case, only a partial region in the longitudinal direction of the slit 37 allows the light of the irradiation region 82 to pass therethrough. Therefore, in this case, only a part of the light in the longitudinal direction of the slit 37 among the light emitted from the measurement target region 25 reaches the imaging spectroscope 34A.

In addition, as the linear illumination LA, a case where a plurality of types of linear illumination LA in different wavelength ranges is irradiated is presumed. For example, let us presume a case where linear illumination LAA and linear illumination LAB in different wavelength ranges are emitted. The linear illumination LAA and the linear illumination LAB are examples of the linear illumination LA. The light emitted from the measurement target region 25 by the irradiation with the linear illumination LA of different wavelength ranges may rotate differently. In this case, as illustrated in FIG. 13C, there is a case where the longitudinal directions XD (XDA, XDB) of the irradiation regions 82

(light intensity distribution 82A, light intensity distribution 82B) of the light emitted from the measurement target region 25 by the irradiation with the plurality of types of linear illuminations LA (LAA, LAB) are different from each other.

Figure 14A:
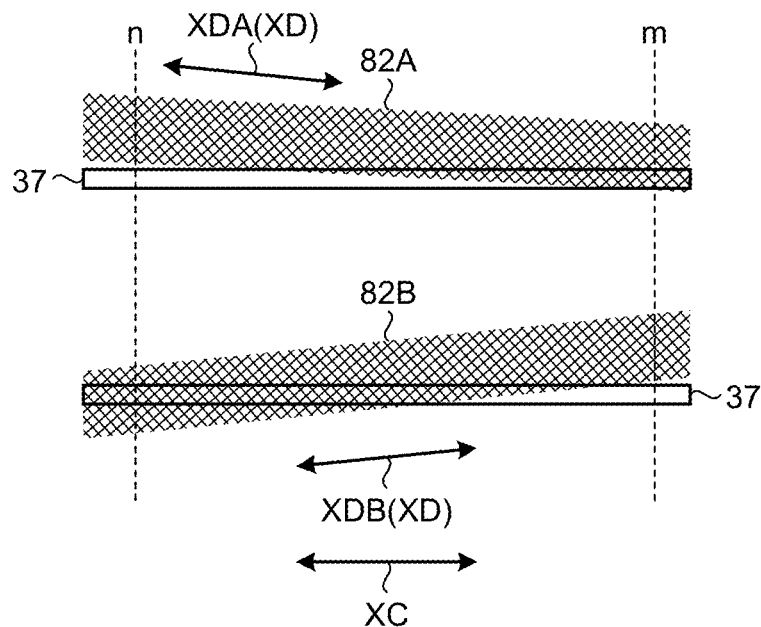
FIG. 14A is an explanatory diagram of the wavelength intensity distribution based on the light intensity distribution according to the second embodiment of the present disclosure.
Figure 14B:
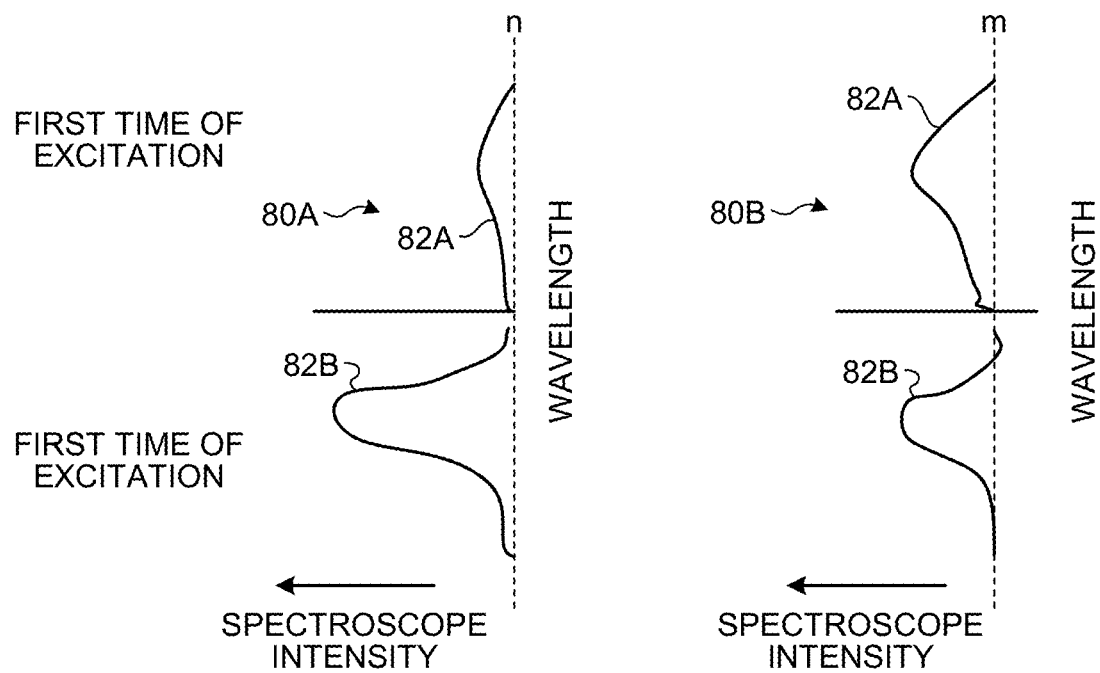
FIG. 14B is an explanatory diagram of the wavelength intensity distribution based on the light intensity distribution according to the second embodiment of the present disclosure.

FIGS. 14A and 14B are explanatory diagrams of the wavelength intensity distribution based on a light intensity distribution 80 when the positional relationship between the slit 37 and the irradiation region 82 is in the state of FIG. 13C. In FIG. 14B, the vertical axis represents the wavelength, and the horizontal axis represents the intensity.

As illustrated in FIG. 14A, when the linear illumination LA having different wavelengths is emitted and imaging is performed twice (in FIG. 14A, the upper diagram illustrates a first wavelength, and the lower diagram illustrates a second wavelength), the longitudinal directions XD (XDA, XDB) of the plurality of irradiation regions 82 (82A, 82B) may be different from each other. In this case, different light intensity distributions 80 corresponding to the inclinations of the irradiation regions 82 are obtained depending on the position of the slit 37 in the longitudinal direction (direction of arrow XC). For example, different light intensities are obtained at different positions n and m in the longitudinal direction of the slit 37.

Specifically, as illustrated in FIG. 14B, the wavelength intensity distribution based on a light intensity distribution 80A at the position n in the longitudinal direction of the slit 37 is different from the wavelength intensity distribution based on the light intensity distribution 80B at the position m.

In this example, by coupling the light intensity distribution 82A and the light intensity distribution 82B of the light emitted from the measurement target region 25 by the irradiation with the linear illumination LA of a plurality of different types of wavelength ranges, discriminability of a plurality of pigments stained in the specimen T included in the measurement target region 25 is enhanced. However, in a case where the light intensity distribution 80 differs depending on the position in the longitudinal direction of the slit 37, light detection unevenness by the imaging spectroscope 34A may occur, and the discriminability of pigments may be deteriorated.

In addition, there is a case where the position of the light receiving region 75 in the first optical signal 74 fluctuates due to fluctuation in environmental temperature or the like.

FIG. 15 is an explanatory diagram of a shift of the light receiving region 75 in the first optical signal 74. A first optical signal 74D and a first optical signal 74E are examples of the first optical signal 74 acquired at different environmental temperatures.

As illustrated in FIG. 15, for example, the position of the light receiving region 75 is shifted by a shift amount D due to the fluctuation in the environmental temperature.

FIG. 16 is a graph illustrating an example of the relationship between the environmental temperature and the position change amount of the light receiving region 75. As illustrated in FIG. 16, the position of the light receiving region 75 also fluctuates as the environmental temperature fluctuates. For example, a rise of 5° C. from 25° C. to 30° C. may cause the position of the light receiving region 75 to be shifted by 55 μm.

For this reason, the irradiation region 82 of the light emitted from the measurement target region 25 and the slit 37 are shifted due to the fluctuation in the environmental temperature, and the utilization efficiency of light by the imaging spectroscope 34A may decrease. Furthermore, in a case where a plurality of pigments is discriminated using the linear illumination LA having a plurality of wavelengths, apparent wavelength characteristics change, and thus the discriminability of the pigments stained in the specimen T deteriorates.

Referring back to FIG. 12, the description will be continued. Therefore, the focus control unit 61D of the present embodiment modifies at least one of the relative position or the relative posture of at least one of a plurality of optical components included in at least one of the light source unit 18 or the imaging unit 31 on the basis of the light intensity distribution 80 of the first optical signal 74.

Specifically, the focus control unit 61D includes the second calculation unit 61E and the drive control unit 61F.

The second calculation unit 61E calculates the maximum light intensity value of the light intensity distribution 80 of the first optical signal 74 acquired in a state where the longitudinal direction of the irradiation region 82 in the opening member 35 and the longitudinal direction of the slit 37 in the opening member 35 intersect. The maximum light intensity value of the light intensity distribution 80 means the maximum light intensity value among the light intensity values at positions along the longitudinal direction (arrow XC direction) of the slit 37 in the light intensity distribution 80.

In this example, when the relative position of the light source focus lens 18D with respect to the light source 18B changes, the maximum light intensity value of the light intensity distribution 80 also changes. Therefore, the drive control unit 61F moves at least one of a plurality of optical components included in at least one of the light source unit 18 or the imaging optical unit 30 to a relative position where the calculated maximum light intensity value is greater than or equal to a second threshold value.

FIGS. 17A, 17B, 17C, and 17D are explanatory diagrams of control of the relative position by the second calculation unit 61E and the drive control unit 61F. Illustrated in FIGS. 17A, 17B, 17C, and 17D are the positional relationship between the slit 37 and the irradiation region 82 when the slit 37 is visually recognized from a direction orthogonal to the optical axis direction. Meanwhile, illustrated in FIGS. 18A, 18B, 18C, and 18D are examples of the light intensity distribution 80 (light intensity distributions 80C to 80F) of the first optical signal 74 corresponding to FIGS. 17A, 17B, 17C, and 17D, respectively. In FIGS. 18A, 18B, 18C, and 18D, the horizontal axis corresponds to each position in the longitudinal direction (arrow XC direction) of the slit 37. In FIGS. 18A, 18B, 18C, and 18D, the vertical axis represents the light intensity value.

Figure 17A:
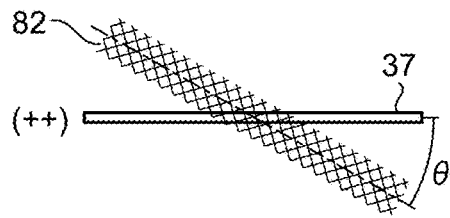
FIG. 17A is an explanatory diagram of control of a relative position according to the second embodiment of the present disclosure.

As illustrated in FIG. 17A, first, the drive control unit 61F modifies the relative posture of at least one of a plurality of optical components included in at least one of the light source unit 18 or the imaging optical unit 30 so that the longitudinal direction of the irradiation region 82 intersects the longitudinal direction of the slit 37.

For example, the drive control unit 61F rotates, by controlling the fifth drive unit 48, the light source 18B so that the longitudinal direction (arrow XC direction) of the slit 37 and the longitudinal direction (arrow XD direction) of the irradiation region 82 intersect at predetermined angle θ. The predetermined angle θ is only required to be determined in advance. The predetermined angle θ is, for example, 30°, but is not limited to 30°. Note that the drive control unit 61F may rotate the opening member 35 by controlling the sixth drive unit 49.

Figure 18A:
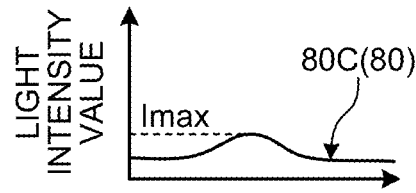
FIG. 18A is a diagram illustrating an example of the light intensity distribution of the first optical signal according to the second embodiment of the present disclosure.

FIG. 18A is a diagram illustrating an example of the light intensity distribution 80C of the first optical signal 74 when the slit 37 and the irradiation region 82 intersect at the predetermined angle θ in the state illustrated in FIG. 17A.

The second calculation unit 61E calculates the maximum intensity value Imax of the light intensity distribution 80C. The second calculation unit 61E calculates the light intensity value of the peak of the light intensity distribution 80C as the maximum intensity value Imax.

Then, the drive control unit 61F modifies the relative position of at least one of a plurality of optical components included in at least one of the light source unit 18 or the imaging optical unit 30 while the state in which the longitudinal direction of the irradiation region 82 and the longitudinal direction of the slit 37 intersect is maintained. In the present embodiment, a mode in which the drive control unit 61F moves the light source focus lens 18D included in the light source unit 18 along the optical axis A1 by controlling the first drive unit 44 will be described as an example.

Then, the drive control unit 61F moves the light source focus lens 18D to a relative position where the maximum light intensity value is greater than or equal to the second threshold value. The second threshold value is only required to be determined in advance.

Figure 17B:
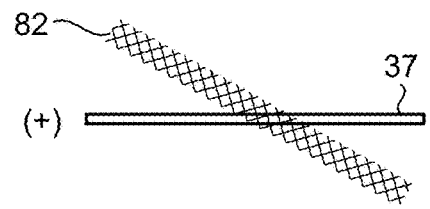
FIG. 17B is an explanatory diagram of control of the relative position according to the second embodiment of the present disclosure.
Figure 17C:
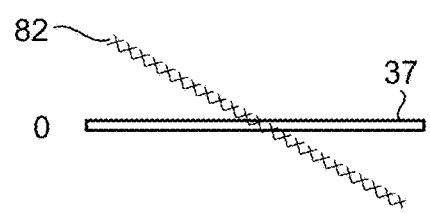
FIG. 17C is an explanatory diagram of control of the relative position according to the second embodiment of the present disclosure.
Figure 17D:
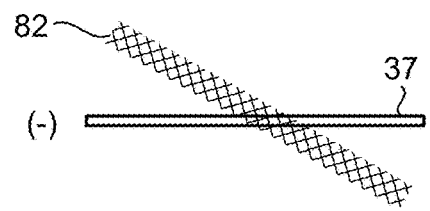
FIG. 17D is an explanatory diagram of control of the relative position according to the second embodiment of the present disclosure.

When the light source focus lens 18D moves along the optical axis A1 by the driving of the drive control unit 61F, the width of the irradiation region 82 changes. FIGS. 17B, 17C, and 17D are diagrams illustrating the irradiation region 82 when the light source focus lens 18D is moved along the optical axis A1 while the state of FIG. 17A in which the longitudinal direction of the irradiation region 82 and the longitudinal direction of the slit 37 intersect is maintained. As illustrated in FIGS. 17A, 17B, 17C, and 17D, the width of the irradiation region 82 changes depending on the position of the light source focus lens 18D.

Figure 18B:
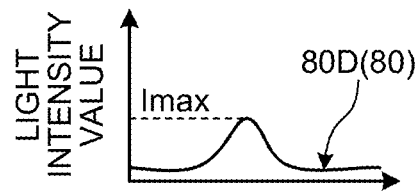
FIG. 18B is a diagram illustrating an example of the light intensity distribution of the first optical signal according to the second embodiment of the present disclosure.
Figure 18C:
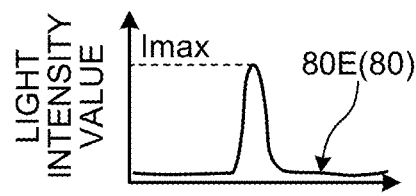
FIG. 18C is a diagram illustrating an example of the light intensity distribution of the first optical signal according to the second embodiment of the present disclosure.
Figure 18D:
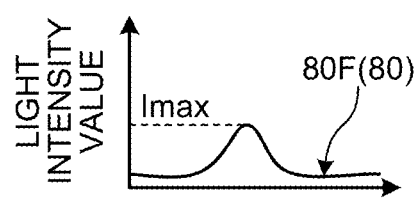
FIG. 18D is a diagram illustrating an example of the light intensity distribution of the first optical signal according to the second embodiment of the present disclosure.

Therefore, light intensity distributions 80 corresponding to each position of the light source focus lens 18D are, for example, as illustrated in FIGS. 18B, 18C, and 18D. FIGS. 18B, 18C, and 18D are diagrams illustrating examples of the light intensity distribution 80 (light intensity distributions 80D to 80F) of the first optical signal 74 when the slit 37 and the irradiation region 82 are in the states of FIGS. 17B, 17C, and 17D, respectively. In a case where the light intensity distributions 80 illustrated in FIGS. 18B, 18C, and 18D are obtained, the second calculation unit 61E calculates the maximum intensity value Imax of each of the light intensity distributions 80.

That is, the drive control unit 61F modifies the distance between the light source 18B and the light source focus lens 18D stepwise by driving and controlling the first drive unit 44. The second calculation unit 61E calculates the maximum light intensity value Imax of the light intensity distribution 80 of the first optical signal 74 acquired in each step. Then, the second calculation unit 61E and the drive control unit 61F repeat the movement of the light source focus lens 18D, acquisition of the first optical signal 74, and calculation of the maximum light intensity value Imax a predetermined number of times M. The number of repetitions M is only required to be an integer greater than or equal to 3. The number of repetitions M is only required to be set in advance.

Then, the drive control unit 61F may set the largest maximum light intensity value Imax among the maximum light intensity values Imax of the light intensity distributions 80 of the first optical signal 74 acquired in the respective M repetitions as the second threshold value. In this case, the drive control unit 61F specifies the relative position of the light source focus lens 18D as of the time when the first optical signal 74 having the largest maximum light intensity value Imax has been acquired. Then, the drive control unit 61F moves the light source focus lens 18D to the specified relative position by driving and controlling the first drive unit 44.

Through these pieces of processing, the drive control unit 61F can move the light source focus lens 18D to a position where an image of the light emitted from the measurement target region 25 is focused on the imaging spectroscope 34A.

At this point, as described with reference to FIG. 13A, it is ideal that the irradiation region 82 of light emitted from a calibration region 27 by the irradiation with the linear illumination LA in the opening member 35 overlaps the entire region of the slit 37. Specifically, it is ideal that the longitudinal direction (direction of arrow XD) of the irradiation region 82 and the longitudinal direction (direction of arrow XC) of the slit 37 coincide with each other. It is also ideal that the slit 37 and the irradiation region 82 overlap over the entire region from one end to the other end of the slit 37 in the longitudinal direction.

Therefore, the focus control unit 61D further executes line alignment processing. The line alignment processing is to aligning the longitudinal direction of the slit 37 and the longitudinal direction of the irradiation region 82.

First, the focus control unit 61D modifies the relative posture of at least one of a plurality of optical components included in at least one of the light source unit 18 or the imaging unit 31 so that the longitudinal direction of the irradiation region 82 coincides with the longitudinal direction of the slit 37.

Specifically, the second calculation unit 61E calculates the difference between the maximum light intensity value and the minimum light intensity value of the light intensity distributions 80 using the light intensity distributions 80 of the first optical signal 74. Then, the drive control unit 61F rotates at least one of the slit 37 or the irradiation region 82 until the difference between the maximum light intensity value and the minimum light intensity value becomes less than or equal to a third threshold value.

For example, the drive control unit 61F rotates at least one of the slit 37 or the light source 18B by driving and controlling at least one of the sixth drive unit 49 or the fifth drive unit 48. Through this processing, the drive control unit 61F rotates at least one of the slit 37 or the irradiation region 82.

Figure 19A:
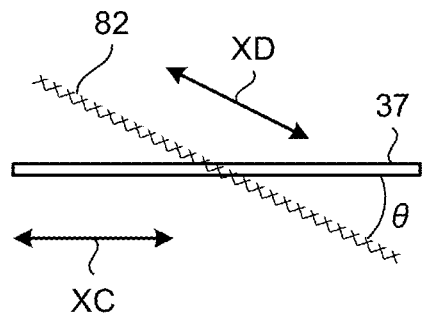
FIG. 19A is an explanatory diagram of line alignment processing according to the second embodiment of the present disclosure.
Figure 19B:
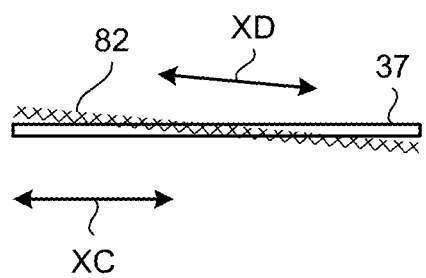
FIG. 19B is an explanatory diagram of the line alignment processing according to the second embodiment of the present disclosure.
Figure 19C:
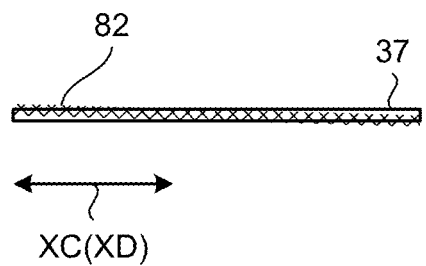
FIG. 19C is an explanatory diagram of line alignment processing according to the second embodiment of the present disclosure.
Figure 20A:
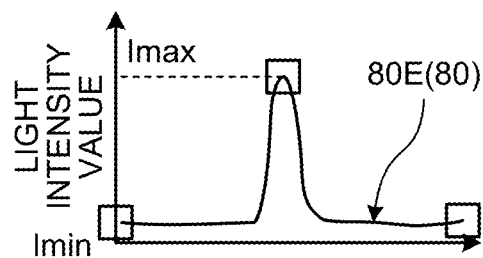
FIG. 20A is a diagram illustrating an example of the light intensity distribution of the first optical signal according to the second embodiment of the present disclosure.
Figure 20B:
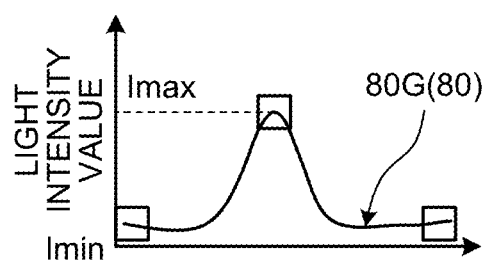
FIG. 20B is a diagram illustrating an example of the light intensity distribution of the first optical signal according to the second embodiment of the present disclosure.
Figure 20C:
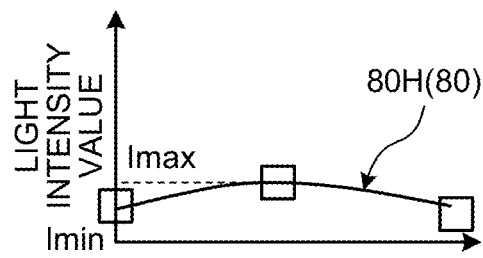
FIG. 20C is a diagram illustrating an example of the light intensity distribution of the first optical signal according to the second embodiment of the present disclosure.

FIGS. 19A, 19B, and 19C are explanatory diagrams of line alignment processing. Illustrated in FIGS. 19A, 19B, and 19C are the positional relationship between the slit 37 and the irradiation region 82 when the slit 37 is visually recognized from a direction orthogonal to the optical axis direction. Meanwhile, illustrated in FIGS. 20A, 20B, and 20C are examples of the light intensity distribution 80 (light intensity distributions 80E, 80G, and 80H) of the first optical signal 74 corresponding to FIGS. 19A, 19B, and 19C, respectively. In FIGS. 20A, 20B, and 20C, the horizontal axis corresponds to the position of the slit 37 in the longitudinal direction. In FIGS. 20A, 20B, and 20C, the vertical axis represents the light intensity value.

As illustrated in FIGS. 19A, 19B, and 19C, the light intensity distribution 80 changes as illustrated in FIGS. 20A, 20B, and 20C by being controlled to rotate stepwise so that the longitudinal direction of the slit 37 coincides with the longitudinal direction of the irradiation region 82. In addition, the difference between the maximum light intensity Imax and the minimum light intensity Imin of the light intensity distribution 80 decreases as the longitudinal direction of the slit 37 and the longitudinal direction of the irradiation region 82 become closer to the state of matching.

Therefore, for the light intensity distribution 80 of the first optical signal 74 obtained at each rotation step, the second calculation unit 61E calculates a difference between the maximum light intensity value Imax and the minimum light intensity value Imin of the light intensity distribution 80.

Then, when the difference between the maximum light intensity value Imax and the minimum light intensity value Imin of the light intensity distribution 80 becomes less than or equal to the third threshold value, the drive control unit 61F ends the rotation control. The third threshold value is only required to be determined in advance.

For example, let us presume that the difference between the maximum light intensity value Imax and the minimum light intensity value Imin of the light intensity distribution 80 illustrated in FIG. 20C is less than or equal to the third threshold value. In this case, as illustrated in FIG. 19C, the longitudinal direction of the slit 37 and the longitudinal direction of the irradiation region 82 substantially coincide with each other, that is, are substantially parallel to each other.

Therefore, by the above processing, the focus control unit 61D can modify the relative posture of at least one of a plurality of optical components included in at least one of the light source unit 18 or the imaging unit 31 so that the longitudinal direction of the irradiation region 82 coincides with the longitudinal direction of the slit 37.

Note there are cases where the irradiation region 82 and the slit 37 may be shifted in a direction orthogonal to the longitudinal direction thereof due to the modification of the relative posture (see FIG. 19C). Therefore, it is preferable that the focus control unit 61D further performs adjustment processing.

Specifically, the drive control unit 61F of the focus control unit 61D specifies the maximum light intensity value of the first optical signal 74 acquired in a state where the light source focus lens 18D is moved to a relative position that has been specified before the line alignment processing. That is, the drive control unit 61F can move the light source focus lens 18D to a position where an image of the light emitted from the measurement target region 25 is focused on the imaging spectroscope 34A.

Figure 21A:
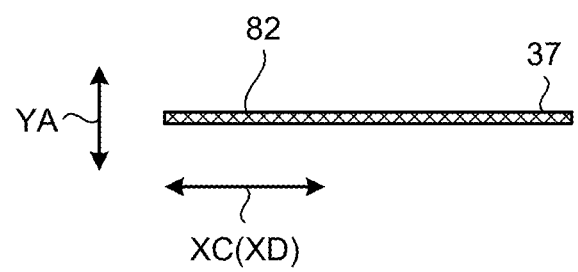
FIG. 21A is a schematic diagram illustrating an example of the positional relationship between a slit and an irradiation region according to the second embodiment of the present disclosure.
Figure 21B:
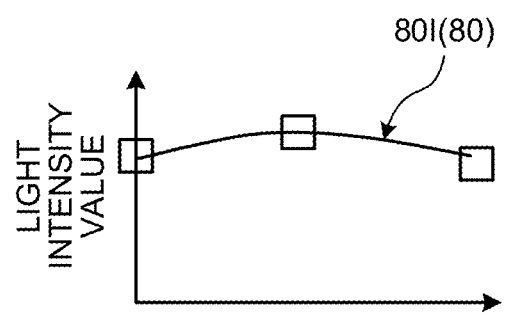
FIG. 21B is a diagram illustrating an example of the light intensity distribution of the first optical signal according to the second embodiment of the present disclosure.

Then, the drive control unit 61F drives and controls the first drive unit 44 until the first optical signal 74 having the specified maximum light intensity value is acquired. The light source focus lens 18D is moved again by the drive control by the first drive unit 44. By this processing, as illustrated in FIG. 21A, the slit 37 and the irradiation region 82 overlap over the entire region from one end to the other end of the slit 37 in the longitudinal direction. In addition, as illustrated in FIG. 21B, a light intensity distribution 80I obtained in this state is in a state where the light intensity value is improved as compared with that in the light intensity distribution 80H (see FIG. 20C) obtained before the processing.

Note that, at this time, the drive control unit 61F may move the position of collimator lens 18C along optical axis A1 by driving and controlling the first drive unit 44. Furthermore, the drive control unit 61F may move both the collimator lens 18C and the light source focus lens 18D by driving and controlling the first drive unit 44. Alternatively, the drive control unit 61F may drive and control an optical device such as a correction mirror while maintaining the positions of the collimator lens 18C and the light source focus lens 18D fixed.

Through these pieces of processing, the focus control unit 61D, that is, the drive control unit 61F can move the light source focus lens 18D to a position where an image of the light emitted from the measurement target region 25 is focused on the imaging spectroscope 34A. Furthermore, the focus control unit 61D can adjust to a state in which the longitudinal direction of the irradiation region 82 coincides with the longitudinal direction of the slit 37, and the slit 37 and the irradiation region 82 overlap from one end to the other end in the longitudinal direction of the slit 37 over the entire region.

Note that, in the present embodiment, similarly to the first embodiment, the above processing is performed using the first optical signal 74 of the light from the calibration region 27 by the irradiation with the linear illumination LA. Here, as illustrated in FIG. 21B, the light intensity value represented by the light intensity distribution 80 of the first optical signal 74 may indicate a different value depending on each position in the longitudinal direction of the slit 37. Specifically, in the light intensity distribution 80, there are cases where the light intensity value in the central portion is high and the light intensity value in the peripheral portion is low.

Therefore, the third calculation unit 61H calculates a correction coefficient for correcting the first optical signal 74.

Figure 22A:
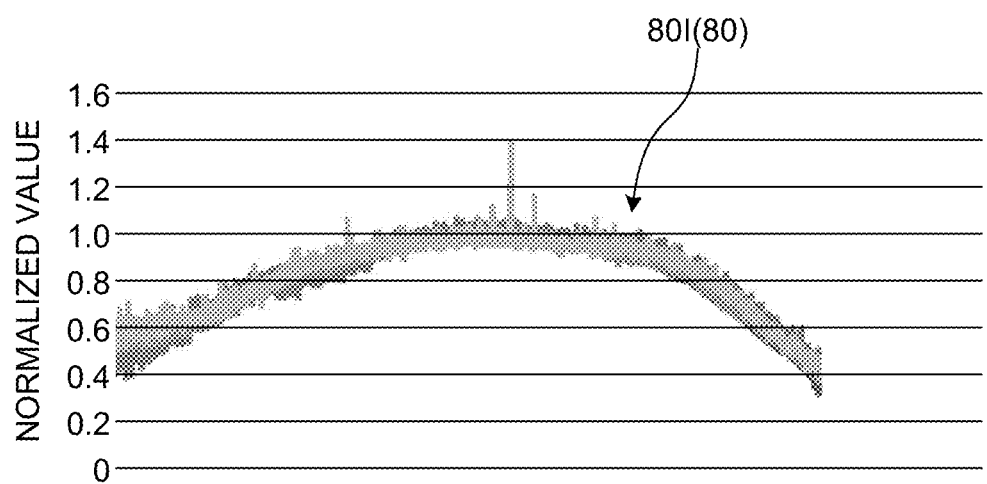
FIG. 22A is an explanatory diagram of correction coefficient calculation according to the second embodiment of the present disclosure.
Figure 22B:
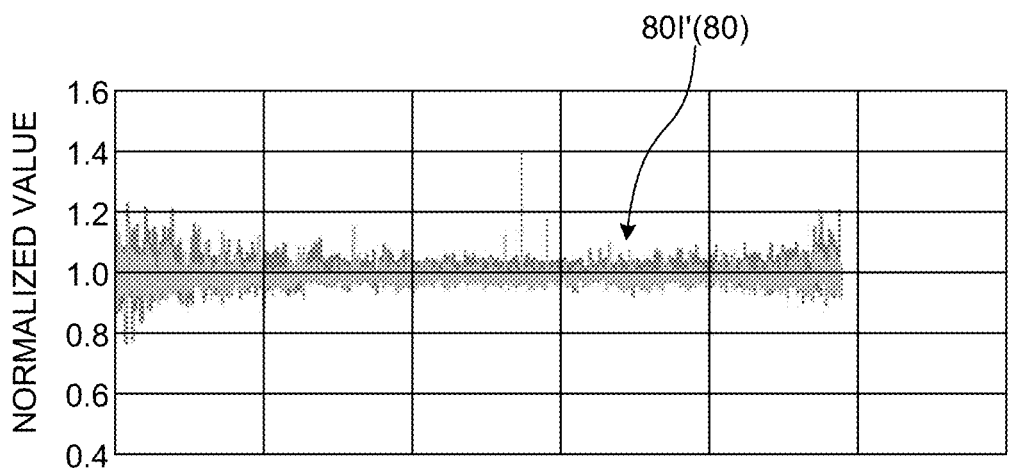
FIG. 22B is an explanatory diagram of the correction coefficient calculation according to the second embodiment of the present disclosure.

FIGS. 22A and 22B are explanatory graphs of correction coefficient calculation. FIG. 22A is a diagram illustrating an example of the light intensity distribution 80I before correction. The light intensity distribution 80I is an example of the light intensity distribution 80. FIG. 22B is a diagram illustrating an example of a light intensity distribution 80I' after correction. In FIGS. 22A and 22B, the horizontal axis indicates each position in the direction of arrow XA in the first optical signal 74. The vertical axis indicates the light intensity value.

The third calculation unit 61H normalizes the maximum light intensity value Imax in the light intensity distribution 80 of the light emitted from the calibration region 27 by the irradiation with the linear illumination LA of a reference wavelength as 1.0. Then, the light intensity distribution 80I illustrated in FIG. 22A is obtained. The third calculation unit 61H calculates the correction coefficient for every pixel position so that the light intensity value represented by the light intensity distribution 80I equals 1.0 over the entire region (that is, all pixels) of the first optical signal 74. Then, the third calculation unit 61H stores the calculated correction coefficient in the storage unit 62 in association with information indicating each pixel position.

A light intensity distribution 80I' illustrated in FIG. 22B is obtained by correcting the light intensity distribution 80I using the correction coefficient. The observation image acquisition control unit 61G is only required to use the light intensity distribution 80I', which has been corrected, as an observation image.

Specifically, the observation image acquisition control unit 61G acquires an observation image similarly to the observation image acquisition control unit 60G. As described above, an observation image is a captured image used for analysis of the specimen T or the like. The observation image acquisition control unit 61G moves a stage 26 stepwise in the Y-axis direction by driving the third drive unit 46. By the movement of the stage 26, the linear illumination LA with which the measurement target region 25 placed on the stage 26 is irradiated is scanned in the scanning direction (Y-axis direction). The observation image acquisition control unit 60G acquires an observation image that is a captured image of the entire measurement target region 25 by executing scanning with the linear illumination LA in the scanning direction and imaging by the imaging spectroscope 34A. That is, the drive control unit 60F acquires the observation image by acquiring the first optical signal 74 at each scanning position in the scanning direction.

Then, in the present embodiment, the observation image acquisition control unit 61G corrects the light intensity value of the first optical signal 74 at each scanning position using the correction coefficient for a corresponding pixel position stored in the storage unit 62. For example, the observation image acquisition control unit 61G smooths the correction coefficient by generating a moving average or an approximate curve and multiplies the first optical signal 74 that is the observation image by the smoothed correction coefficient, thereby obtaining the first optical signal 74 that has been corrected. Then, the observation image acquisition control unit 61G is only required to acquire the first optical signal 74, which has been corrected, as the observation image.

Next, an example of a flow of information processing executed by the control device 17 according to the present embodiment will be described.

Figure 23:
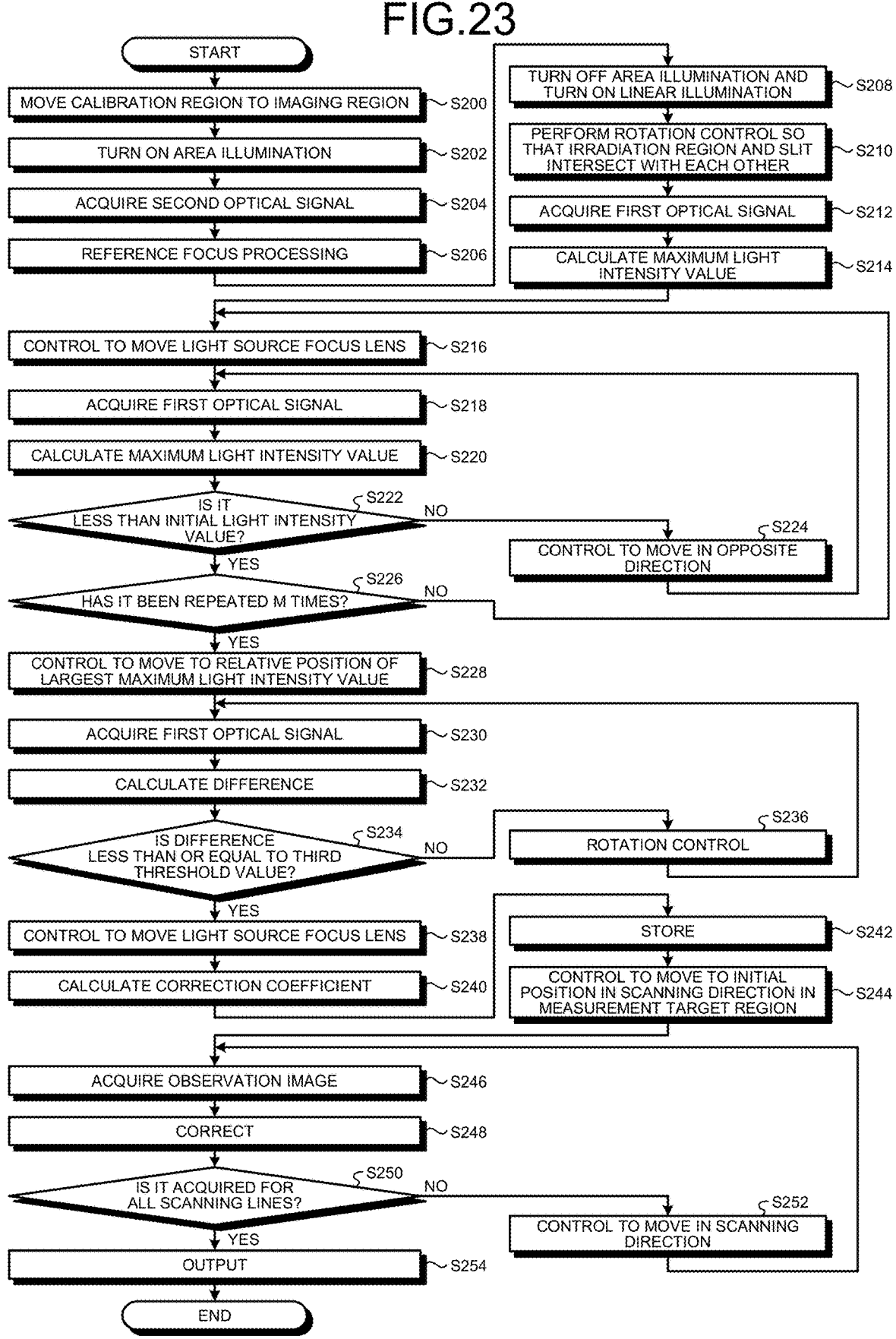
FIG. 23 is a flowchart illustrating an example of a flow of information processing according to the second embodiment of the present disclosure.

FIG. 23 is a flowchart illustrating an example of a flow of information processing executed by the control device 17. Note that it is based on the premise that the measurement target region 25 including the measurement target member 24 including the specimen T and the calibration region 27 is placed on the stage 26 before the control device 17 executes the following information processing. The placement of the measurement target region 25 onto the stage 26 may be performed manually or may be automatically controlled using a loader, a manipulator, or the like.

First, the control unit 61 drives and controls the third drive unit 46 so that the calibration region 27 is located within the imaging region of the imaging unit 31. By this drive control, the calibration region 27 is moved into the imaging region of the imaging unit 31 (step S200).

Next, the light source control unit 60A controls the light source 18B so as to turn off the linear illumination LA and to turn on the area illumination LB (step S202).

The acquisition unit 60B acquires the second optical signal from the imaging spectroscope 34A (step S204).

The reference focus control unit 61C executes reference focus processing using the second optical signal acquired in step S204 (step S206). In step S204, the reference focus control unit 61C adjusts the initial relative position of the objective lens 22 to a position where the contrast ratio is maximized by the contrast method.

Next, the light source control unit 60A controls the light source 18B so as to turn off the area illumination LB and to turn on the linear illumination LA (step S208).

The drive control unit 61F of the focus control unit 61D controls at least one of the fifth drive unit 48 or the sixth drive unit 49 so that the longitudinal direction of the irradiation region 82 in the opening member 35 intersects the longitudinal direction of the slit 37 (step S210). By the control in step S210, at least one of the light source 18B and the opening member 35 is rotationally driven, and the longitudinal direction of the irradiation region 82 in the opening member 35 and the longitudinal direction of the slit 37 intersect.

Next, the acquisition unit 60B acquires the first optical signal 74 from the imaging spectroscope 34A (step S212). The second calculation unit 61E of the focus control unit 61D calculates the maximum light intensity value of the first optical signal 74 acquired in step S212 (step S214).

The drive control unit 61F moves the light source focus lens 18D included in the light source unit 18 by a predetermined distance along the optical axis A1 (step S216).

The acquisition unit 60B acquires the first optical signal 74 captured in a state where the light source focus lens 18D is moved by the processing in step S216 or step S224 to be described later from the imaging spectroscope 34A via the acquisition unit 60B (step S218).

The second calculation unit 61E calculates the maximum light intensity value of the first optical signal 74 acquired in step S218 (step S220). The drive control unit 61F determines whether or not the maximum light intensity value calculated in step S220 is less than the initial light intensity value which is the maximum light intensity value calculated in step S214 (step S222).

If negative determination is made in step S222 (step S222: No), the process proceeds to step S224. In step S224, the drive control unit 61F moves the light source focus lens 18D by a predetermined distance along the optical axis A1 in a direction opposite to the moving direction in step S216 (step S224). Then, the process returns to step 218 described above.

If affirmative determination is made in step S222 (step S222: Yes), the process proceeds to step S226. The drive control unit 61F determines whether or not the processing of steps S216 to S222 has been repeated the predetermined number of times M (step S226).

If negative determination is made in step S226 (step S226: No), the process returns to step S216. If affirmative determination is made in step S226 (step S226: Yes), the process proceeds to step S228.

In step S228, the drive control unit 61F moves the light source focus lens 18D to a relative position as of the time of acquisition of the first optical signal 74 indicating the largest maximum intensity value among the maximum light intensity values of the first optical signal 74 acquired in each of the M repetitions (step S228).

By the processing in step S228, the light source focus lens 18D can move the light source focus lens 18D to a position where an image of the light emitted from the measurement target region 25 is focused on the imaging spectroscope 34A.

Specifically, by the processing of steps S210 to S226, the relationship between the semi-transparent mirror 28 and the slit 37 and the light intensity distribution 80 are as illustrated in FIGS. 17A, 17B, 17C, 17D, 18A, 18B, 18C, and 18D. Then, the reference focus control unit 61C can move the light source focus lens 18D so as to be in the state illustrated in FIGS. 17C and 18C.

Next, the focus control unit 61D further executes the line alignment processing.

Specifically, the acquisition unit 60B acquires the first optical signal 74 from the imaging spectroscope 34A (step S230).

The second calculation unit 61E of the focus control unit 61D calculates a difference between the maximum light intensity value and the minimum light intensity value of the light intensity distribution 80 of the first optical signal 74 acquired in step S230 (step S232). Then, the drive control unit 61F determines whether or not the difference calculated in step S232 is less than or equal to the third threshold value (step S234). If the difference exceeds the third threshold value (step S234: No), the process proceeds to step S236. In step S236, the drive control unit 61F rotates at least one of the slit 37 or the light source 18B by a predetermined rotation angle by driving and controlling at least one of the sixth drive unit 49 or the fifth drive unit 48 to (step S236). Then, the process returns to step S230 described above.

If affirmative determination is made in step S234 (step S234: Yes), the process proceeds to step S238. In step S238, the focus control unit 61D executes the adjustment processing. Specifically, the drive control unit 61F of the focus control unit 61D specifies the maximum light intensity value of the first optical signal 74 acquired in step S230. Then, the drive control unit 61F drives and controls the first drive unit 44 until the first optical signal 74 having the specified maximum light intensity value is acquired. The light source focus lens 18D is moved again by the drive control by the first drive unit 44 (step S238).

By the processing in step S238, as illustrated in FIG. 21A, the slit 37 and the irradiation region 82 overlap over the entire region from one end to the other end of the slit 37 in the longitudinal direction. In addition, as illustrated in FIG. 21B, a light intensity distribution 80I obtained in this state is in a state where the light intensity value is improved as compared with that in the light intensity distribution 80H (see FIG. 20C) obtained before the processing.

Next, the third calculation unit 61H calculates a correction coefficient for correcting the first optical signal 74 (step S240). The control unit 61 stores the correction coefficient calculated in step S240 in the storage unit 62 (step S242).

Next, the observation image acquisition control unit 61G moves the stage 26 to the initial position in the scanning direction (Y-axis direction) of the linear illumination LA by driving the third drive unit 46 (step S244). The initial position in the present embodiment is a region deviated from the calibration region 27, that is, a region where the specimen T is present. By this drive control, the measurement target region 25 where the specimen T is present is moved into the imaging region of the imaging unit 31.

Next, the observation image acquisition control unit 61G acquires an observation image for one scanning line by acquiring the first optical signal 74 from the imaging spectroscope 34A (step S246).

Next, the observation image acquisition control unit 61G corrects the first optical signal 74 acquired in step S246 using the correction coefficient stored in the storage unit 62 (step S248).

The observation image acquisition control unit 61G determines whether or not first optical signals 74 for all scanning lines in the measurement target member 24 have been acquired (step S250). If negative determination is made in step S250 (step S250: No), the process proceeds to step S252.

In step S252, the observation image acquisition control unit 61G controls the third drive unit 46 so as to move the irradiation region of the linear illumination LA in a scanning direction (Y-axis direction) by one step (step S252). Then, the process returns to step S246 described above.

If affirmative determination is made in step S250 (step S250: Yes), the process proceeds to step S254. In step S254, the observation image acquisition control unit 61G outputs the observation image, which is a plurality of first optical signals 74 that have been corrected at respective scanning positions in the scanning direction, to the server device 10 via the communication unit 64 (step S254). Then, this routine ends.

As described above, in the microscope system 1B of the present embodiment, the reference focus control unit 61C calculates the maximum light intensity value of the first optical signal 74 acquired in a state where the longitudinal direction of the irradiation region 82 in the opening member 35 and the longitudinal direction of the slit 37 intersect. Then, in the microscope system 1B, at least one relative position of the plurality of optical components included in at least one of the imaging unit 31 and the light source unit 18 is modified to a relative position where the maximum light intensity value is greater than or equal to the second threshold value.

Therefore, the microscope system 1B of the present embodiment has the following effects in addition to the effects of the first embodiment. That is, in the microscope system 1B, even in a case where the position of the irradiation region 82 in the opening member 35 moves with respect to the slit 37, an image of the light emitted from the measurement target region 25 can be focused on the imaging spectroscope 34A with high accuracy.

In addition, in the microscope system 1B of the present embodiment, the focus control unit 61D modifies the relative posture of at least one of a plurality of optical components included in at least one of the light source unit 18 or the imaging unit 31 so that the longitudinal direction of the irradiation region 82 coincides with the longitudinal direction of the slit 37.

Therefore, in the microscope system 1B of the present embodiment, even in a case where the longitudinal direction of the irradiation region 82 and the longitudinal direction of the slit 37 do not coincide with each other, it is possible to perform control so that these longitudinal directions coincide with each other. Therefore, the microscope system 1B can further improve the utilization efficiency of light in addition to the effects of the first embodiment.

In addition, in the microscope system 1B of the present embodiment, it is possible to provide an observation image having high discriminability of pigments in addition to the above effects.

Furthermore, in the present embodiment, a mode in which the relative position of the light source focus lens 18D is modified on the basis of the light intensity distribution 80 of the first optical signal 74 acquired from the imaging spectroscope 34A has been described as an example. However, the microscope system 1 may modify the relative position of the light source focus lens 18D on the basis of the light distribution of the pupil-separated captured image 70 acquired from the focus detection unit 36 included in the imaging unit 31.

In this case, for example, the microscope system 1B is only required to use the light intensity distribution of the image 72A or the image 72B, which is a pupil-separated image 72 included in the pupil-separated captured image 70, as the light intensity distribution 80 of the first optical signal 74 and to execute processing similar to the above.

(Modification)

Note that the microscope system 1 and the microscope system 1B described in the above embodiments may be combined. That is, both the focus detection unit 36 and the imaging optical unit may be included.

Figure 24:
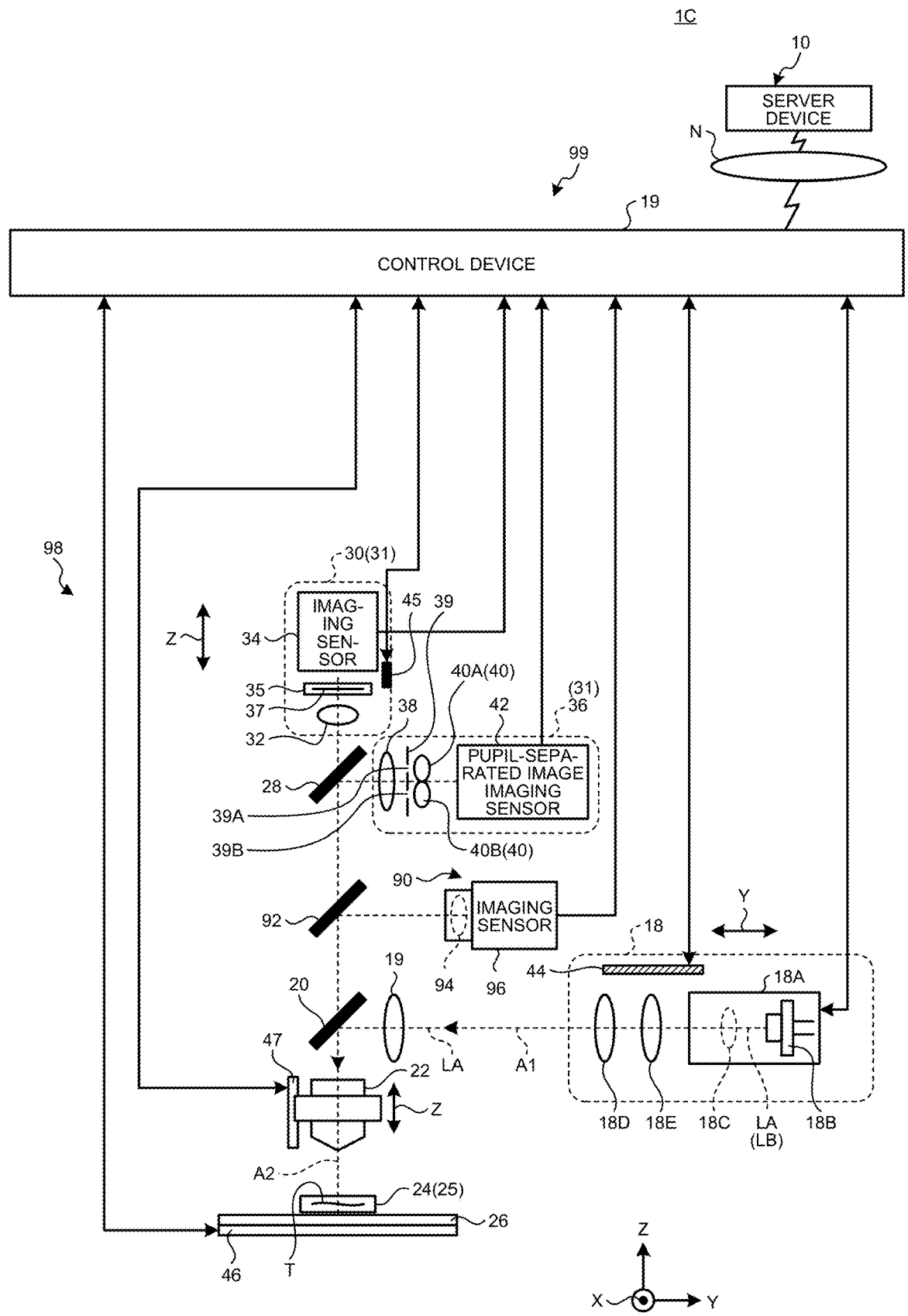
FIG. 24 is a schematic diagram illustrating an example of a microscope system according to a modification of the present disclosure.

FIG. 24 is a schematic diagram illustrating an example of a microscope system 1C of the present modification. The microscope system 1C has a similar configuration to that of the microscope system 1 except that, for example, a focus detection unit 36 is further included in the microscope system 1 of the first embodiment.

Specifically, the microscope system 1C includes an imaging device 99 instead of the imaging device 12. The imaging device 99 includes a measurement unit 98 instead of the measurement unit 14. The measurement unit 98 has a similar configuration to that of the measurement unit 14 of the first embodiment except that the focus detection unit 36 is further included.

In the present modification, it is only required to execute processing similar to that of the above embodiment except that the first optical signal 74 obtained by any one of the focus detection unit 36 or the imaging sensor 96 is used at the time of acquisition of an observation image.

(Hardware Configuration)

Figure 25:
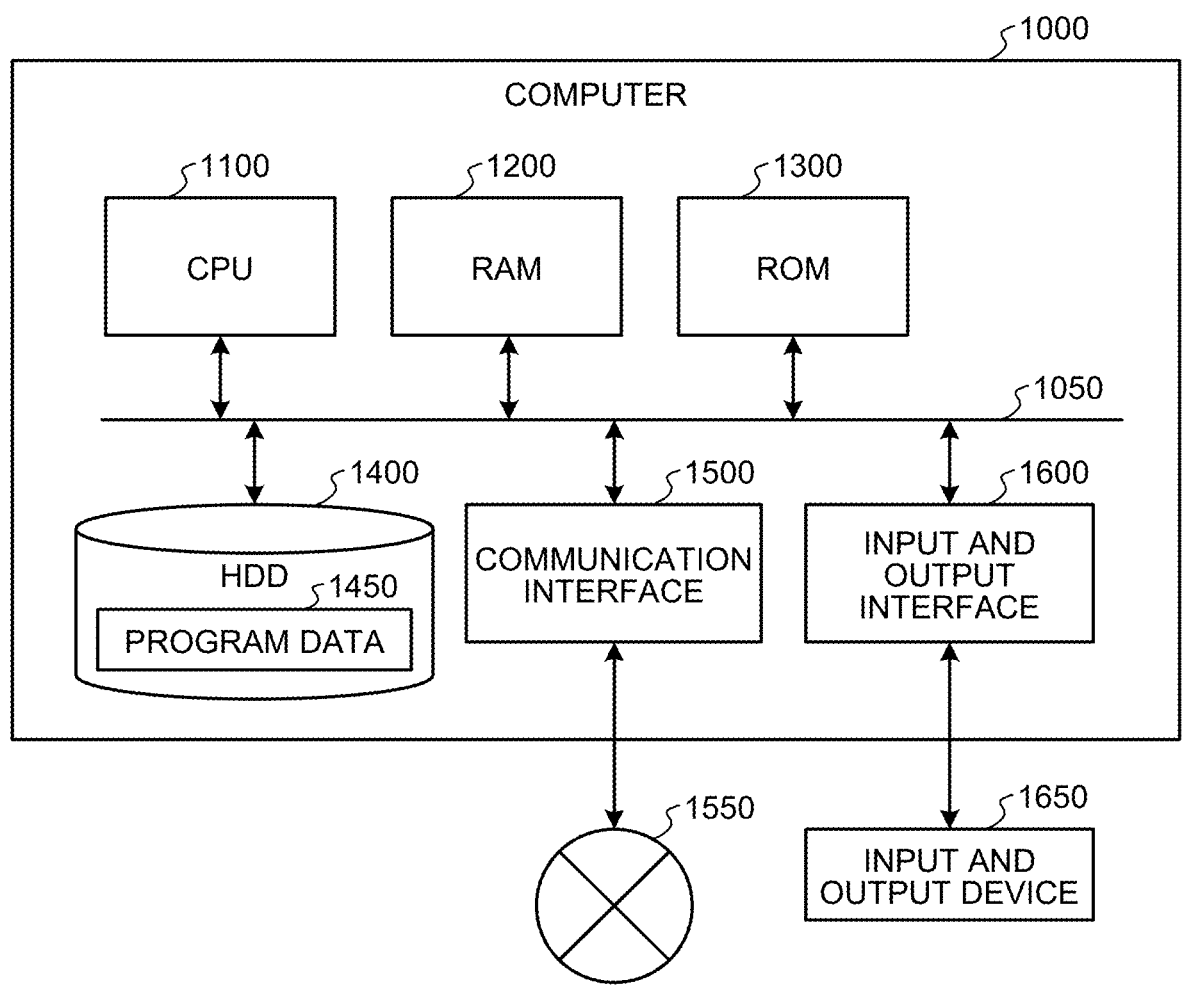
FIG. 25 is a hardware configuration diagram according to an embodiment and a modification of the present disclosure.

FIG. 25 is a hardware configuration diagram illustrating an example of a computer 1000 that implements the functions of the control device 16 according to the embodiments and the modifications.

The computer 1000 includes a CPU 1100, a random access memory (RAM) 1200, a read only memory (ROM) 1300, a hard disk drive (HDD) 1400, a communication interface 1500, and an input and output interface 1600. The units of the computer 1000 are connected by a bus 1050.

The CPU 1100 operates in accordance with a program stored in the ROM 1300 or the HDD 1400 and controls each of the units. For example, the CPU 1100 loads a program stored in the ROM 1300 or the HDD 1400 in the RAM 1200 and executes processing corresponding to the program.

The ROM 1300 stores a boot program such as a basic input output system (BIOS) executed by the CPU 1100 when the computer 1000 is activated, a program dependent on the hardware of the computer 1000, and the like.

The HDD 1400 is a computer-readable recording medium that non-transiently records a program to be executed by the CPU 1100, data used by such a program, and the like. Specifically, the HDD 1400 is a recording medium that records a program according to the present disclosure, which is an example of program data 1450.

The communication interface 1500 is an interface for the computer 1000 to be connected with an external network 1550 (for example, the Internet). For example, the CPU 1100 receives data from another device or transmits data generated by the CPU 1100 to another device via the communication interface 1500.

The input and output interface 1600 is an interface for connecting an input and output device 1650 and the computer 1000. For example, the CPU 1100 receives data from an input device such as a keyboard or a mouse via the input and output interface 1600. In addition, the CPU 1100 transmits data to an output device such as a display, a speaker, or a printer via the input and output interface 1600. Furthermore, the input and output interface 1600 may function as a media interface that reads a program or the like recorded in a predetermined recording medium. A medium refers to, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, in a case where the computer 1000 functions as the control device 16 or the control device 17 according to the above embodiments, the CPU 1100 of the computer 1000 implements, by executing a program loaded on the RAM 1200, the functions of the light source control unit 60A, the acquisition unit 60B, the reference focus control unit 60C, the focus control unit 60D, the first calculation unit 60E, the drive control unit 60F, the observation image acquisition control unit 60G, the reference focus control unit 61C, the focus control unit 61D, the second calculation unit 61E, the drive control unit 61F, the observation image acquisition control unit 61G, the third calculation unit 61H, and the like. The HDD 1400 also stores a program according to the present disclosure and data. Note that although the CPU 1100 reads the program data 1450 from the HDD 1400 and executes the program data 1450, as another example, these programs may be acquired from another device via the external network 1550.

Note that the present technology can also have the following configurations.

(1)

A microscope system including:
a light source unit that emits linear illumination parallel to a first direction;
an objective lens that condenses the linear illumination onto a measurement target region;
an acquisition unit that acquires a first optical signal indicating a light intensity value of light emitted from the measurement target region by the linear illumination; and
a focus control unit that controls at least one of a relative position or a relative posture of the light source unit and an imaging unit that generates the first optical signal on a basis of a light intensity distribution of the first optical signal.

(2)

The microscope system according to (1),
wherein the focus control unit includes:
a first calculation unit that calculates a distribution width of the light intensity distribution of the first optical signal; and
a drive control unit that moves at least one of a plurality of optical components included in at least one of the light source unit or the imaging unit to a relative position where the distribution width is less than or equal to a first threshold value.

(3)

The microscope system according to (2),
wherein the focus control unit
moves a focus lens included in the light source unit in an optical axis direction on a basis of a light intensity distribution of the first optical signal.

(4)

The microscope system according to any one of (1) to (3),
wherein the measurement target region includes
a specimen and a calibration region that emits light of a second specific wavelength range by irradiation with light of a first specific wavelength range,
the imaging unit
receives light emitted from the measurement target region via an opening member having a slit parallel to a second direction, and
the focus control unit
modifies at least one of a relative position or a relative posture of at least one of a plurality of optical components included in at least one of the light source unit or the imaging unit on a basis of a light intensity distribution of the first optical signal indicating a light intensity value of light emitted from the calibration region by the linear illumination.

(5)

The microscope system according to (4),
wherein the focus control unit includes:
a second calculation unit that calculates a maximum light intensity value of a light intensity distribution of the first optical signal acquired in a state where a longitudinal direction of an irradiation region of the light emitted from the calibration region by the linear illumination and a longitudinal direction of the slit in the opening member intersect with each other; and
a drive control unit that moves at least one of the plurality of optical components to a relative position where the maximum light intensity value is greater than or equal to a second threshold value.

(6)
The microscope system according to (5),
wherein the drive control unit
modifies a relative posture of at least one selected from the light source unit, the imaging unit, and at least one of a plurality of optical components included in at least one of the light source unit or the imaging unit so that the longitudinal direction of the irradiation region coincides with the longitudinal direction of the slit.

(7)
The microscope system according to any one of (1) to (6), including
a third calculation unit that calculates a correction coefficient for correcting a light intensity value of the first optical signal.

(8)
An imaging method executed by a computer, the imaging method including:
a step of acquiring a first optical signal indicating a light intensity value of light emitted from a measurement target region by linear illumination parallel to a first direction; and
a step of modifying at least one of a relative position or a relative posture of at least one of a plurality of optical components included in at least one of a light source unit that emits the linear illumination or an imaging unit that generates the first optical signal on a basis of a light intensity distribution of the first optical signal.

(9)
An imaging device including: a measurement unit; and software used to control an operation of the measurement unit,
wherein the software is installed in the imaging device,
the measurement unit includes:
a light source unit that emits linear illumination parallel to a first direction;
an objective lens that condenses the linear illumination onto a measurement target region; and
an imaging unit, and
the software
acquires, from the imaging unit, a first optical signal indicating a light intensity value of light emitted from the measurement target region by the linear illumination, and
modifies at least one of a relative position or a relative posture of at least one of a plurality of optical components included in at least one of the light source unit or the imaging unit on a basis of a light intensity distribution of the first optical signal.

REFERENCE SIGNS LIST 1, 1B, 1C MICROSCOPE SYSTEM
18 LIGHT SOURCE UNIT
18B LIGHT SOURCE
18D LIGHT SOURCE FOCUS LENS
22 OBJECTIVE LENS
25 MEASUREMENT TARGET REGION
27 CALIBRATION REGION
31 IMAGING UNIT
35 OPENING MEMBER
37 SLIT
44 FIRST DRIVE UNIT
45 SECOND DRIVE UNIT
46 THIRD DRIVE UNIT
47 FOURTH DRIVE UNIT
48 FIFTH DRIVE UNIT
49 SIXTH DRIVE UNIT
60B ACQUISITION UNIT
60C, 61C REFERENCE FOCUS CONTROL UNIT
60D, 61D FOCUS CONTROL UNIT
60E FIRST CALCULATION UNIT
60F, 61F DRIVE CONTROL UNIT
61E SECOND CALCULATION UNIT
61H THIRD CALCULATION UNIT
74 FIRST OPTICAL SIGNAL
80 LIGHT INTENSITY DISTRIBUTION

The invention claimed is:

1. A microscope system, comprising:
a light source unit configured to emit linear illumination parallel to a first direction;
an objective lens configured to condense the linear illumination onto a measurement target region;
an acquisition unit configured to acquire a first optical signal that indicates a light intensity value of light emitted from the measurement target region by the linear illumination;
a focus control unit configured to control at least one of a relative position or a relative posture of the light source unit; and
an imaging unit configured to generate the first optical signal based on a light intensity distribution of the first optical signal.

2. The microscope system according to claim 1, wherein the focus control unit includes:
a first calculation unit configured to calculate a distribution width of the light intensity distribution of the first optical signal; and
a drive control unit configured to move at least one of a plurality of optical components in at least one of the light source unit or the imaging unit to a relative position, wherein the distribution width is less than or equal to a first threshold value.

3. The microscope system according to claim 2, wherein the focus control unit is further configured to move a focus lens in the light source unit in an optical axis direction based on the light intensity distribution of the first optical signal.

4. The microscope system according to claim 1, wherein the measurement target region includes:
a specimen and a calibration region configured to emit light of a second specific wavelength range by irradiation with light of a first specific wavelength range,
the imaging unit configured to receive light emitted from the measurement target region via an opening member having a slit parallel to a second direction, and
the focus control unit configured to modify at least one of a relative position or a relative posture of at least one of a plurality of optical components in at least one of the light source unit or the imaging unit based on the light intensity distribution of the first optical signal that indicates a light intensity value of light emitted from the calibration region by the linear illumination.

5. The microscope system according to claim 4, wherein the focus control unit includes:
a second calculation unit configured to calculate a maximum light intensity value of the light intensity distribution of the first optical signal acquired in a state where a longitudinal direction of an irradiation region of the light emitted from the calibration region by the linear illumination and a longitudinal direction of the slit in the opening member intersect with each other; and
a drive control unit configured to moves at least one of the plurality of optical components to a relative position where the maximum light intensity value is greater than or equal to a second threshold value.

6. The microscope system according to claim 5, wherein the drive control unit is further configured to modify a relative posture of at least one selected from the light source unit, the imaging unit, or at least one of the plurality of optical components in at least one of the light source unit or the imaging unit so that the longitudinal direction of the irradiation region coincides with the longitudinal direction of the slit.

7. The microscope system according to claim 1, further comprises:
a third calculation unit configured to calculate a correction coefficient to correct a light intensity value of the first optical signal.

8. An imaging method, comprising:
acquiring, by a computer, a first optical signal that indicates a light intensity value of light emitted from a measurement target region by linear illumination parallel to a first direction; and
modifying, by the computer, at least one of a relative position or a relative posture of at least one of a plurality of optical components in at least one of a light source unit that emits the linear illumination or an imaging unit that generates the first optical signal based on a light intensity distribution of the first optical signal.

9. An imaging device, comprising:
a measurement unit and software to control an operation of the measurement unit, wherein
the software is installed in the imaging device,
the measurement unit includes:
a light source unit configured to emit linear illumination parallel to a first direction;
an objective lens that condenses the linear illumination on a measurement target region; and
an imaging unit, and
the software is configured to:
acquire, from the imaging unit, a first optical signal that indicates_a light intensity value of light emitted from the measurement target region by the linear illumination, and
modify at least one of a relative position or a relative posture of at least one of a plurality of optical components in at least one of the light source unit or the imaging unit based on a light intensity distribution of the first optical signal.

* * * * *